(12) United States Patent
Zhang et al.

(10) Patent No.: US 12,160,611 B2
(45) Date of Patent: *Dec. 3, 2024

(54) IMPLICIT GEOMETRY PARTITION FOR POINT CLOUD CODING

(71) Applicant: TENCENT AMERICA LLC, Palo Alto, CA (US)

(72) Inventors: Xiang Zhang, Sunnyvale, CA (US); Wen Gao, West Windsor, NJ (US); Sehoon Yea, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/340,274

(22) Filed: Jun. 23, 2023

(65) Prior Publication Data

US 2023/0345046 A1    Oct. 26, 2023

Related U.S. Application Data

(63) Continuation of application No. 17/669,023, filed on Feb. 10, 2022, which is a continuation of application
(Continued)

(51) Int. Cl.
  *H04N 19/597* (2014.01)
  *H04N 19/169* (2014.01)
  *H04N 19/174* (2014.01)
(52) U.S. Cl.
  CPC ......... *H04N 19/597* (2014.11); *H04N 19/174* (2014.11); *H04N 19/1883* (2014.11)

(58) Field of Classification Search
  CPC .. H04N 19/119; H04N 19/174; H04N 19/176; H04N 19/182; H04N 19/1883; H04N 19/597; H04N 19/70; H04N 19/96
  (Continued)

(56) References Cited

U.S. PATENT DOCUMENTS

| | | |
|---|---|---|
| 6,429,864 B1 | 8/2002 | Schwarzer |
| 9,035,807 B2 | 5/2015 | Jiang et al. |

(Continued)

FOREIGN PATENT DOCUMENTS

| | | |
|---|---|---|
| EP | 3429207 A1 | 1/2019 |
| KR | 10-2014-0056290 A | 5/2014 |

(Continued)

OTHER PUBLICATIONS

Extended European Search Report in EP20831850.1, mailed Oct. 31, 2023, 17 pages.
(Continued)

*Primary Examiner* — Behrooz M Senfi
(74) *Attorney, Agent, or Firm* — ArentFox Schiff LLP

(57) ABSTRACT

In a method for point cloud processing, a bitstream corresponding to a sequence of coded point cloud frames is received. Whether an implicit geometry partition is enabled for the sequence of coded point cloud frames is determined. An octree representing a geometry of points in a bounding box in a coded point cloud frame in the sequence of coded point cloud frames is reconstructed based on whether the implicit geometry partition is determined to be enabled for the sequence of coded point cloud frames.

20 Claims, 14 Drawing Sheets

Related U.S. Application Data

No. 16/909,642, filed on Jun. 23, 2020, now Pat. No. 11,381,840.

(60) Provisional application No. 62/910,387, filed on Oct. 3, 2019, provisional application No. 62/904,384, filed on Sep. 23, 2019, provisional application No. 62/867,063, filed on Jun. 26, 2019.

(58) Field of Classification Search
USPC .................................................. 375/240.12
See application file for complete search history.

(56) References Cited

U.S. PATENT DOCUMENTS

| | | | |
|---|---|---|---|
| 10,693,492 B1* | 6/2020 | Lasserre | ............... G06T 9/001 |
| 10,798,389 B2 | 10/2020 | Vosoughi et al. | |
| 11,122,102 B2 | 9/2021 | Oh | |
| 11,381,840 B2* | 7/2022 | Zhang | ................... H04N 19/70 |
| 11,743,498 B2* | 8/2023 | Zhang | ................ H04N 19/119 |
| | | | 375/240.12 |
| 2013/0077684 A1 | 3/2013 | Chen et al. | |
| 2014/0184430 A1 | 7/2014 | Jiang et al. | |
| 2015/0146794 A1 | 5/2015 | Hoang | |
| 2015/0172670 A1 | 6/2015 | Li et al. | |
| 2016/0086353 A1 | 3/2016 | Lukac et al. | |
| 2017/0347100 A1 | 11/2017 | Chou et al. | |
| 2019/0306506 A1 | 10/2019 | Chen et al. | |
| 2019/0318488 A1 | 10/2019 | Lim et al. | |
| 2020/0211232 A1 | 7/2020 | Lasserre et al. | |
| 2020/0252657 A1 | 8/2020 | Lasserre et al. | |
| 2020/0258202 A1 | 8/2020 | Cai et al. | |
| 2020/0302655 A1* | 9/2020 | Oh | ........................ G06T 9/001 |
| 2020/0334866 A1 | 10/2020 | Lasserre et al. | |
| 2020/0413096 A1 | 12/2020 | Zhang et al. | |
| 2021/0006786 A1 | 1/2021 | Gao et al. | |
| 2021/0029187 A1 | 1/2021 | Oh | |
| 2021/0042989 A1 | 2/2021 | Zhang et al. | |

FOREIGN PATENT DOCUMENTS

| | | | |
|---|---|---|---|
| WO | 2017209961 A1 | 12/2017 | |
| WO | 2017217191 A1 | 12/2017 | |
| WO | 2019011637 A1 | 1/2019 | |
| WO | 2019070952 A1 | 4/2019 | |
| WO | 2020243874 A1 | 12/2020 | |
| WO | WO-2021002730 A1 * | 1/2021 | ......... G06K 9/00597 |

OTHER PUBLICATIONS

ISO/IEC, "G-PCC Future Enhancements," Motion Picture Expert Group of ISO/IEC JTC1/SC29/WG11, Dec. 2019, Document No. n18887, 4 pages.
Kathariya et al., "PCC CE3.1 BTQT—Binary Tree Embedded Quadtree for Point Cloud Compression," International Organisation for Standardisation ISO/IEC JTC1/SC29/WG11 Coding of Moving Pictures and Audio, Oct. 2017, No. m42163, MPEG2017/m41622, 8 pages.
Li et al., "Multi-Type-Tree," Joint Video Exploration Team of ISO/IEC JTC1/SC29/WG11 and ITU-T SG 16, 4th Meeting: Chengdu, CN, Oct. 15-21, 2016, Document No. JVET-D0117, 3 pages.
Zhang et al., "[G-PCC] [New proposal] Signaling delta QPs for adaptive geometry quantization in point cloud coding," International Organisation for Standardisation ISO/IEC JTC1/SC29/WG11, Coding of Moving Pictures and Audio, Jul. 2019, Gothenburg, Sweden, MPEG2019/m49232, 10 pages.
Zhu et al., "CE1: Implicit QT and BT Partitions on Picture Boundary (Test 2.0.14)," Joint Video Experts Team (JVET) of ITU-T SG 16 WP 3 and ISO/IEC JTC 1/SC 29/WG 11, 11th Meeting: Ljubljana, Slovenia, Jul. 10-20, 2018, Document: JVET-K0317, 6 pages.
Extended European Search Report in EP20865464.0, mailed Oct. 26, 2022, 8 pages.
International Search Report and Written Opinion in PCT/US2020/070167, mailed Sep. 3, 2020, 13 pages.
ISO/IEC "G-PCC codec description v4," International Organisation for Standardisation ISO/IEC JTC1/SC29/WG11 Coding of Moving Pictures and Audio, Jul. 2019, N18673, 3DG, Gothenburg, SE, 63 pages.
ISO/IEC "G-PCC codec description v5," International Organisation for Standardisation ISO/IEC JTC1/SC29/WG11 Coding of Moving Pictures and Audio, Oct. 2019, N18891, 3DG, Geneva, CH, 75 pages.
ISO/IEC, "Information Technology—MPEG-I (Coded Representation of Immersive Media)—Part 9: Geometry-based Point Cloud Compression," ISO/IEC JTC 1/SC 29/WG 11, 2019, 23090-9:2019(E), CD Stage, 104 pages.
ISO/IEC, "Information Technology—MPEG-I (Coded Representation of Immersive Media)—Part 9: Geometry-based Point Cloud Compression," ISO/IEC JTC 1/SC 29/WG 11, 2019, 23090-9:2019(E), WD Stage, 89 pages.
Kathariya et al., "Scalable point cloud geometry coding with binary tree embedded quadtree," 2018 IEEE International Conference on Multimedia and Expo (ICME), Jul. 23, 2018, pp. 1-6.
Lasserre et al., "Planar mode in octree-based geometry coding," Blackberry, 2016, m48906, 33 pages.
Mammou et al., "G-PCC codec description v2," International Organisation for Standardisation ISO/IEC JTC1/SC29/WG11 Coding of Moving Pictures and Audio, Jan. 2019, N18189, 3DG, Marrakech, MA, 40 pages.
Mekuria et al., "Requirements for Point Cloud Compression," International Organisation for Standardisation ISO/IEC JTC1/SC29/WG11 Coding of Moving Pictures and Audio, Feb. 2016, MPEG2016/n16330, Geneva, CH, 3 pages.
Nakagami et al., "Point cloud compression technology proposal by Sony," International Organisation for Standardisation ISO/IEC JTC1/SC29/WG11 Coding of Moving Pictures and Audio, Oct. 2017, MPEG2017/M41665, Sony corporation, Macau, CN, 43 pages.
Office Action and Search Report in RU2021128692/11, mailed Apr. 12, 2022, 6 pages.
Office Action and Search Report in SG11202110395V, mailed Feb. 6, 2023, 7 pages.
Office Action in CA3134855, mailed Sep. 11, 2023, 5 pages.
Office Action in IN202147047431 mailed Mar. 30, 2022, 5 pages.
Ranger, S., "Icosatree Data Partitioning of Massive Geospatial Point Clouds with User-Selectable Entities and Surface Modeling," Dec. 2016, Rochester Institute of Technology, Master's Thesis, 50 pages.
Tulvan et al., "Use Cases for Point Cloud Compression (PCC)," International Organisation for Standardisation ISO/IEC JTC1/SC29/WG11 Coding of Moving Pictures and Audio, Jun. 2016, MPEG2015/N16331, Geneva, CH, 8 pages.
Zhang et al. "[G-PCC] [New proposal] Implicit geometry partition for point cloud coding," International Organisation for Standardisation ISO/IEC JTC1/SC29/WG11 Coding of Moving Pictures and Audio, Jul. 2019, MPEG2019/m49231, Tencent, Gothenburg, Sweden, 14 pages.
Zhang et al. "[G-PCC] [new proposal] Parallel Octree Coding for Point Cloud Compression," International Organisation for Standardisation ISO/IEC JTC1/SC29/WG11 Coding of Moving Pictures and Audio, Oct. 2019, MPEG2019/m50930, Tencent, Geneva, Switzerland, 7 pages.
Zhang et al., "[G-PCC] [CE13.22] Report on Parallel Octree Coding for Point Cloud Compression," International Organisation for Standardisation ISO/IEC JTC1/SC29/WG11 Coding of Moving Pictures and Audio, Jan. 2020, MPEG2020/m52397, Tencent, Brussels, Belgium, 6 pages.
Zhang et al., "Implicit Geometry Partition for Point Cloud Computing," U.S. Appl. No. 62/867,063, filed Jun. 26, 2019, 30 pages.
Zhang et al., "On Geometry Coding for Point Clouds," U.S. Appl. No. 62/904,384, filed Sep. 23, 2019, 22 pages.
Zhang et al., "Signaling of QP Variations for Adaptive Geometry Quantization in Point Cloud Computing," U.S. Appl. No. 62/869,946, filed Jul. 2, 2019, 30 pages.

(56) References Cited

OTHER PUBLICATIONS

Office Action received for Korean Patent Application No. 10-2021-7024723, mailed on Jul. 19, 2024, 13 pages (7 pages of English Translation and 6 pages of Original Document).

* cited by examiner

IMPLICIT GEOMETRY PARTITION FOR POINT CLOUD CODING

INCORPORATION BY REFERENCE

This application is a continuation of U.S. application Ser. No. 17/669,023, "IMPLICIT QUADTREE OR BINARY-TREE GEOMETRY PARTITION FOR POINT CLOUD CODING" filed on Feb. 10, 2022, which is a continuation of U.S. application Ser. No. 16/909,642, "IMPLICIT QUADTREE OR BINARY-TREE GEOMETRY PARTITION FOR POINT CLOUD CODING" filed on Jun. 23, 2020, now U.S. Pat. No. 11,381,840, which claims the benefit of priority to a series of U.S. Provisional Application Nos. 62/867,063, "IMPLICIT GEOMETRY PARTITION FOR POINT CLOUD CODING" filed on Jun. 26, 2019, 62/904,384, "ON GEOMETRY CODING FOR POINT CLOUDS" filed on Sep. 23, 2019, and 62/910,387, "ADDITIONAL INFORMATION ON ADAPTIVE GEOMETRY QUANTIZATION AND IMPLICIT GEOMETRY PARTITION FOR POINT CLOUD CODING" filed on Oct. 3, 2019, each of which are incorporated by reference herein in their entirety.

TECHNICAL FIELD

The present disclosure relates to point cloud coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Point cloud has been widely used in recent years. For example, point cloud can be used in autonomous driving vehicles for object detection and localization. Point cloud is also used in geographic information systems (GIS) for mapping, and in cultural heritage to visualize and archive cultural heritage objects and collections, etc.

A point cloud frame contains a set of high dimensional points, typically of three dimensional (3D), each including 3D position information and additional attributes such as color, reflectance, etc. They can be captured using multiple cameras and depth sensors, or Lidar in various setups, and may be made up of thousands up to billions of points in order to realistically represent the original scenes.

Compression technologies are needed to reduce the amount of data required to represent a point cloud for faster transmission or reduction of storage. ISO/IEC MPEG (JTC 1/SC 29/WG 11) has created an ad-hoc group (MPEG-PCC) to standardize the compression techniques for static or dynamic point clouds.

SUMMARY

Aspects of the disclosure provide a method of point cloud geometry decoding in a point cloud decoder. The method can include receiving a bitstream including a slice of a coded point cloud frame, and reconstructing an octree representing a geometry of points in a bounding box of the slice using implicit geometry partition where a current node of the octree is partitioned with a quadtree (QT) partition or a binary tree (BT) partition.

In an embodiment, how to partition the current node of the octree using one of the QT partition, the BT partition, or an octree (OT) partition is determined based on a predefined condition. In an embodiment, how to partition the current node of the octree using one of the QT partition, the BT partition, or an OT partition is determined based on one or more parameters. One of the one or more parameters can be signaled in the bitstream or using a locally preconfigured value.

In an embodiment, occupancy information belonging to an 8-bins occupancy code of the current node of the octree are received from the bitstream. Each occupancy bit corresponds to an occupied child node of the current node of the octree. 4 bins belonging to the 8-bins occupancy code are not signaled in the bit stream when the current node of the octree is partitioned with the QT partition, and 6 bins belonging to the 8-bins occupancy code are not signaled in the bitstream when the current node of the octree is partitioned with the BT partition. In the present application, we may also refer 8-bins occupancy code as 8-bits occupancy code or each bin of the 8-bins occupancy code as a bit.

In an embodiment, one or more syntax elements indicating three-dimension (3D) sizes of the bounding box of the slice of the coded point cloud frame are received from the bitstream. In an embodiment, a value of a variable, denoted by partitionSkip, specifying a partition type and a partition direction of the current node of the octree is determined. In an example, the variable partitionSkip is represented in binary form with three bits corresponding to x, y, and z directions, respectively, and each bit indicates whether a partition is performed along the respective x, y, or z direction. In an example, a depth in an x, y, or z dimension for a child node of the current node of the octree is updated based on the variable partitionSkip.

In an embodiment, the reconstructing the octree further includes receiving a syntax element indicating the current node of the octree has a single occupied child node, receiving 1 bin if the variable partitionSkip indicates the BT partition, or 2 bins if the variable partitionSkip indicates the QT partition, and determining an occupancy map identifying occupied child nodes of the current node of the octree based on the received 1 or 2 bins.

In an embodiment, during a parsing process over the bitstream to determine a syntax element of an occupancy map identifying occupied child nodes of the current node of the octree, a bin or multiple bins of the syntax element of the occupancy map can be skipped based on the variable partitionSkip.

In an embodiment, for a child node of the current node of the octree coded in a direct mode, a log2 size for each of x, y, and z directions, denoted dx, dy, and dz, respectively, for the child node is determined based on the variable partitionSkip. Positions of points in the child node are coded by fixed-length coding with (dx, dy, dz) bits, respectively.

In an embodiment, a syntax element is received from the bitstream indicating one of the following parameters: a maximal number of implicit QT and BT partitions performed before OT partitions, a minimal size of implicit QT and BT partitions that prevents implicit QT and BT partitions of a node when all dimensions of the node are smaller than or equal to the minimal size, or a priority indicating which of implicit QT or BT partition is performed first when both QT and BT partitions are allowed.

In an embodiment, when an octree depth of the current node is smaller than a parameter K, or when a smallest log2 size among log2 sizes in x, y, and z directions of the current node is equal to a parameter M, a partition type and a partition direction for partitioning the current node can be determined according to conditions in the following table:

| | Partition type and direction | | |
|---|---|---|---|
| | QT along x-y axes | QT along x-z axes | QT along y-z axes |
| Condition | $d_z < d_x = d_y$ | $d_y < d_x = d_z$ | $d_x < d_y = d_z$ |
| | Partition type and direction | | |
| | BT along x axis | BT along y axis | BT along z axis |
| Condition | $d_y < d_x$ and $d_z < d_x$ | $d_x < d_y$ and $d_z < d_y$ | $d_x < d_z$ and $d_y < d_z$ | where the parameter K is an integer in a range of $0 \leq K \leq \max(d_x, d_y, d_z) - \min(d_x, d_y, d_z)$, and defines maximum times of implicit QT and BT partitions that are allowed before OT partitions, the parameter M is an integer in a range of $0 \leq M \leq \min(d_x, d_y, d_z)$, defines a minimal size of implicit QT and BT partitions, and prevents implicit QT and BT partitions of a node when all dimensions of the node are smaller than or equal to M, and $d_x$, $d_y$, and $d_z$ are the log2 sizes of the current node in x, y, and z directions, respectively. $d_x$, $d_y$, and $d_z$ correspond to $d_x$, $d_y$, and $d_z$ in the above table, respectively. The two notations are used interchangeably in this disclosure.

In an embodiment, when an octree depth of the current node is smaller than a parameter K, or when a smallest log2 size among log2 sizes in x, y, and z directions of the current node is equal to a parameter M, a variable partitionSkip can be determined as follows,

```
if (dx < MaxNodeDimLog2),
   partitionSkip |= 4;
if (dy < MaxNodeDimLog2),
   partitionSkip |= 2;
if (dz < MaxNodeDimLog2),
   partitionSkip |= 1.
```

The variable partitionSkip is represented in binary form with three bits, and specifies the partition type and the partition direction of the current node of the octree. The parameter K is an integer in a range of $0 \leq K \leq \max(d_x, d_y, d_z) - \min(d_x, d_y, d_z)$, and defines maximum times of implicit QT and BT partitions that are allowed before OT partitions. The parameter M is an integer in a range of $0 \leq M \leq \min(d_x, d_y, d_z)$, defines a minimal size of implicit QT and BT partitions, and prevents implicit QT and BT partitions of a node when all dimensions of the node are smaller than or equal to M. The $d_x$, $d_y$, and $d_z$ are log2 sizes of the current node in x, y, and z directions, respectively. The MaxNodeDimLog2 represents the maximum log2 size among $d_x$, $d_y$, and $d_z$. The operator |=represents a compound bitwise OR operation.

In an embodiment, a flag can be received from the bitstream indicating whether implicit geometry partition is enabled for a sequence of point cloud frames or the slice of the coded point cloud frame. In an embodiment, a planar mode is determined to be ineligible at an x, y, or z direction where a partition is not performed for the current node. In an embodiment, a geometry octree occupancy parsing process is performed in which for a bin having an index of binIdx in an occupancy code, a variable binIsInferred is set according to the following: (a) if either of the following conditions are true, binIsInferred is set equal to 1: (1) a variable NeighbourPattern is equal to 0 and a number of previously decoded 1-valued bins is less than or equal to (binIdx+minOccupied−maxOccupied), or (2) the variable NeighbourPattern is not equal to 0, binIdx is equal to maxOccupied−1 and values of all previous decoded bins are zero, where minOccupied=2, and maxOccupied=8 if an OT partition is applied, maxOccupied=4 if the QT partition is applied, maxOccupied=2 if the BT partition is applied, and (b) otherwise, if neither of the above conditions are true, binIsInferred is set equal to 0.

In an embodiment, a parameter K and a parameter M are used. The parameter K indicates a maximal number of implicit QT and BT partitions before OT partitions, and the parameter M indicates a minimal size of implicit QT and BT partitions that prevents implicit QT and BT partitions of a node when all dimensions of the node are smaller than or equal to the minimal size. The parameters K and M can be updated according to: (a) if K is greater than a difference between a maximum root node log2 dimension and a minimum root node log2 dimension of the slice, K is changed to a difference between the maximum root node log2 dimension and the minimum root node log2 dimension of the slice; (b) if M is greater than the minimum root node log2 dimension of the slice, M is changed to the minimum root node log2 dimension of the slice; (c) if the maximum root node log2 dimension and the minimum root node log2 dimension of the slice are equal, M is changed to 0; and (d) if a trisoup mode is enabled, K is changed to the difference between the maximum root node log2 dimension and the minimum root node log2 dimension of the slice, and M is changed to the minimum root node log2 dimension of the slice. Note that trisoup node log2 dimension needs to be no greater than the minimum root node log2 dimension of the slice.

Aspects of the disclosure provide an apparatus of point cloud geometry decoding. The apparatus can include circuitry configured to receive a bitstream including a slice of a coded point cloud frame, and reconstruct an octree representing a geometry of points in a bounding box of the slice using implicit geometry partition where a current node of the octree is partitioned with a quadtree (QT) partition, or a binary tree (BT) partition.

Aspects of the disclosure provide a non-transitory computer-readable medium storing instructions that, when executed by a processor, cause the processor to perform the method of point cloud geometry decoding.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

This disclosure is related to geometry based point cloud compression (G-PCC). Techniques of implicit quadtree (QT) or binary-tree (BT) partition are described. When implicit QT or BT partition is applied, geometry of a point cloud can be partitioned along a subset of all dimensions implicitly when certain criteria are met, instead of partitioning along all dimensions all the time.

I. Point Cloud Coding Encoder and Decoder

1. Point Cloud Data

Point cloud data (or point cloud) is used to represent a three-dimensional (3D) scene or object in some emerging applications such as immersive virtual reality (VR)/augmented reality (AR)/mixed reality (MR), automotive/robotic navigation, medical imaging, and the like. A point cloud can include a collection of individual 3D points. Each point is associated with a set of 3D coordinates indicating a 3D position of the respective point and a number of other attributes such as color, surface normal, opaque, reflectance, etc. In various embodiments, input point cloud data can be quantized and subsequently organized into a 3D grid of cubic voxels that can be described using an octree data structure. A resulting voxelized octree facilitates the traversal, search, and access of the quantized point cloud data.

A point cloud frame can include a set of 3D points at a particular time instance. Point cloud frames can be used to reconstruct an object or a scene as a composition of such points. They can be captured using multiple cameras and depth sensors in various setups, and may be made up of thousands and even billions of points in order to realistically represent reconstructed scenes. A sequence of point cloud frames can be referred to as a point cloud. A set of Cartesian co-ordinates associated with 3D points of a point cloud frame can be referred to as a geometry of those 3D points.

Compression technologies are needed to reduce the amount of data required to represent a point cloud (e.g., a sequence of point cloud frames). As such, technologies are needed for lossless compression of point clouds for use in real-time communications and six Degrees of Freedom (6 DoF) virtual reality. In addition, technologies are sought for lossless point cloud compression in the context of dynamic mapping for autonomous driving and cultural heritage applications, etc. Further, standards are needed to address compression of geometry and attributes (e.g., colors and reflectance), scalable/progressive coding, coding of sequences of point clouds captured over time, and random access to subsets of the point cloud.

2. Coordinates Quantization

In an embodiment, coordinates of points in the input cloud data can first be quantized. For example, real number values of the coordinates may be quantized into integer values. After the quantization, more than one point may share a same position in some voxels. Those duplicate points optionally can be merged into a single point.

3. Geometry Coding Based on an Octree

Figure 1:
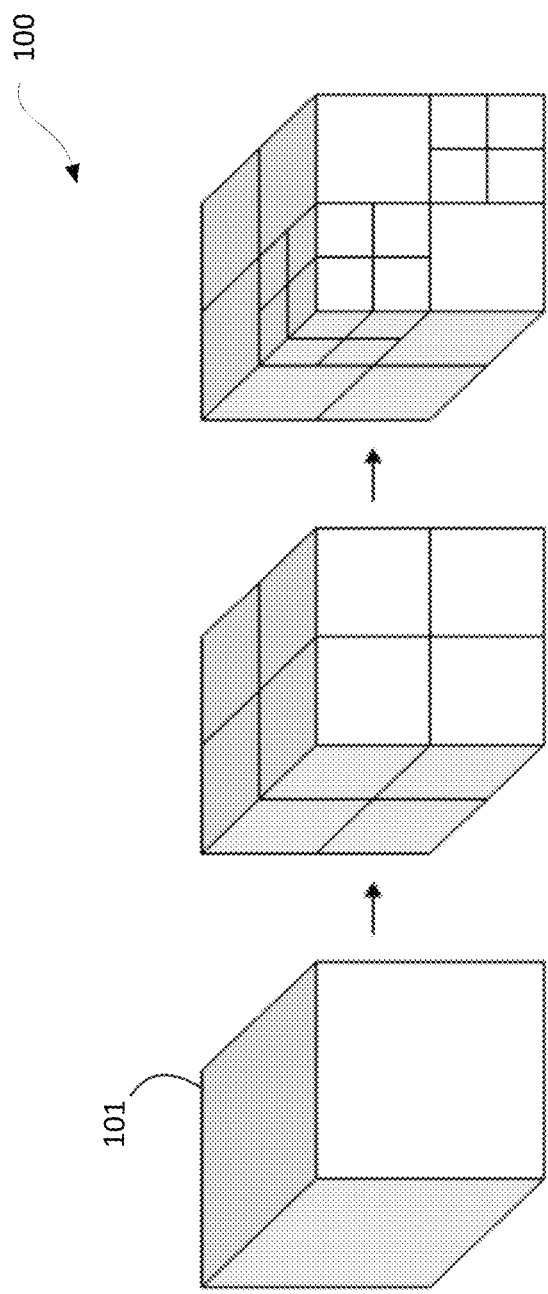
FIG. 1 shows a recursive subdivision process in accordance with an embodiment.

FIG. 1 shows a recursive subdivision process (100) in accordance with an embodiment. The process (100) can be performed to generate an octree structure to represent positions of a set of points in a point cloud. As shown, a cubical axis-aligned bounding box (101) containing the set of points is first defined. Then, the bounding box (101) is recursively subdivided to build the octree structure. As shown, at each stage, a current cube can be subdivided into 8 sub-cubes. An 8-bit code, referred to as an occupancy code, can be generated to indicate whether each of the 8 sub-cubes contains points. For example, each sub-cube is associated with a 1-bit value. If the sub-cube is occupied, the respective sub-cube has a bit value of 1; otherwise, the respective sub-cube has a bit value of 0. Occupied sub-cubes can be divided until a predefined minimum size of the sub-cubes is reached. A sub-cube of the minimum size is a voxel corresponding to the octree structure. A sequence of occupancy codes can thus be generated, and subsequently be compressed and transmitted from an encoder to a decoder. By decoding the occupancy codes (e.g., performing an octree decoding process), the decoder can obtain a same octree structure as the encoder, or an estimation of the octree structure.

4. Attribute Transfer

As a result of the octree generation or coding process, at the encoder side, a sub-cube with the minimum size may contain more than one point. Thus, a position corresponding to a voxel (e.g., a center of the respective sub-cube) may correspond to multiple sets of attributes from multiple points. In such a scenario, in an embodiment, an attribute transfer process can be performed to determine one set of attributes based on the multiple sets of attributes for the respective voxel. For example, an averaged attribute of a subset of nearest neighboring points can be used as an attribute of the respective voxel. Different methods may be employed in various embodiments for attribute transfer purposes.

5. Level of Detail (LOD) Generation

Figure 2:
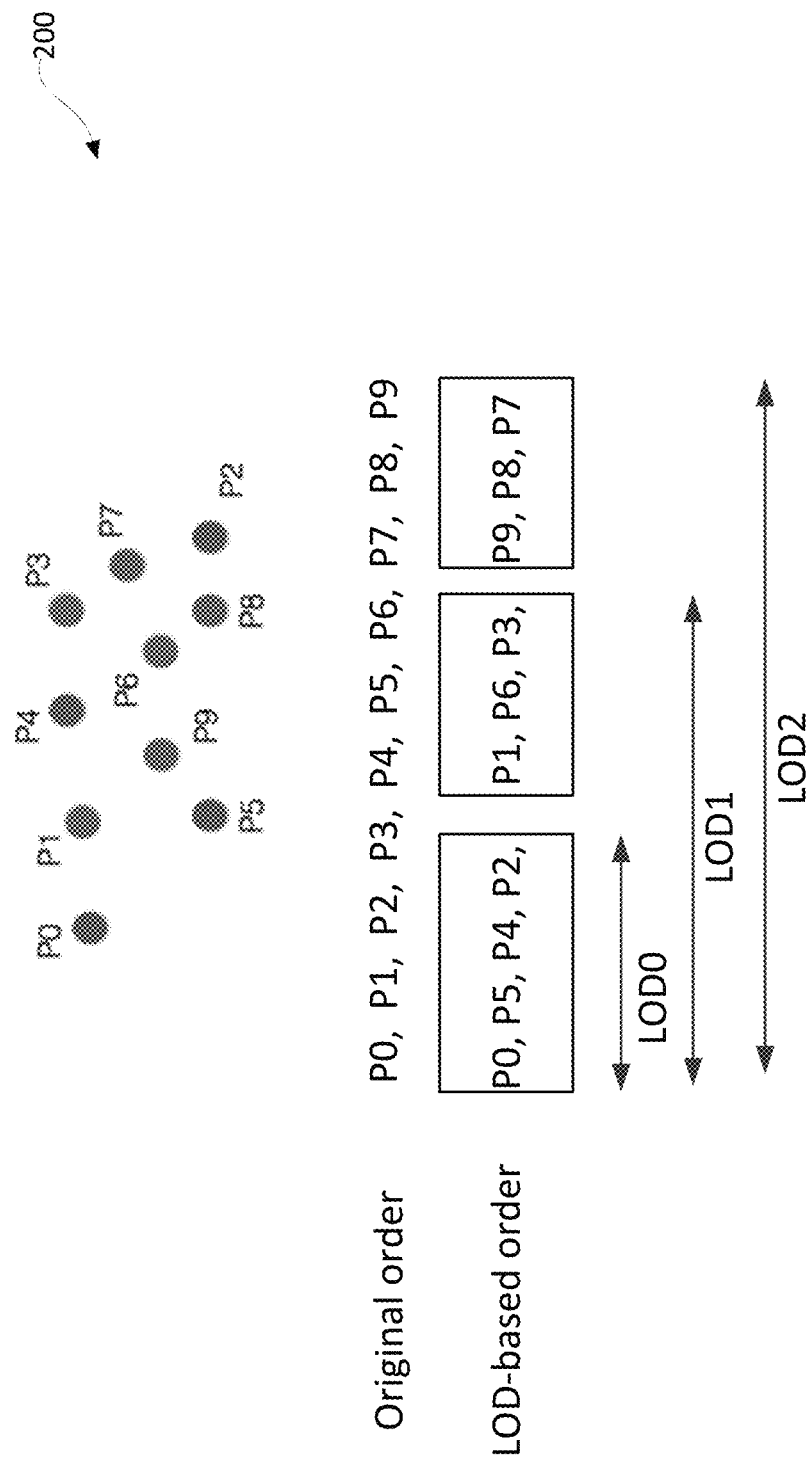
FIG. 2 shows a level of detail (LOD) generation process in accordance with an embodiment.

FIG. 2 shows a level of detail (LOD) generation process (200) in accordance with an embodiment. The process (200) can be performed on the quantized positions (e.g., voxel positions) ordered according to the octree decoding process. As a result of the process (200), the points can be re-organized or re-ordered into a set of refinement levels. The process (200) can be performed identically at the encoder and decoder. A subsequent attribute coding process can be performed at the encoder or decoder according to the order defined by the process (200) (referred to as the LOD-based order).

Specifically, FIG. 2 shows three LODs: LOD0, LOD1, and LOD2. A Euclidean distance, d0, d1, or d2, can be specified for LOD0, LOD1, and LOD2, respectively. A subset of points P0-P9 is included in each LOD. The distances between each pair of points in the respective LOD is larger than or equal to the respective Euclidean distance. The Euclidean distances can be arranged in a manner that d0>d1>d2. Under such arrangement, a higher refinement level includes fewer points that are farther from each other, and provides a coarser representation of the point cloud, while a lower refinement level includes more points closer to each other, and provides a finer representation of the point cloud.

As a result of the above LOD generation process (200), the points in an original order (octree decoding order) from P0 to P9 can be re-organized into an LOD-based order: P0, P5, P4, P2, P1, P6, P3, P9, P8, and P7.

6. Attributes Prediction

The attributes associated with the point cloud can be encoded and decoded in the order defined by the LOD generation process. For example, point by point, in the LOD-based order, an attribute prediction of each current point (a point currently under processing) can be determined by performing an attribute prediction process at the encoder and/or decoder. A similar attribute prediction process can be performed at the encoder and the decoder.

With the obtained attribute prediction, at the encoder, a residual signal can be generated by subtracting the attribute prediction value from a respective original attribute value of the current point. The residual signal can then, individually or in combination with other residual signals, be further compressed. For example, transform and/or quantization operations may be performed, and followed by entropy coding of resulting signals. The compressed residual signal can be transmitted to the encoder in a bit stream.

At the decoder, a residual signal can be recovered by performing an inverse of the coding process at the encoder for coding a residual signal. With the obtained attribute prediction and the recovered residual signal corresponding to the current point, a reconstructed attribute of the current point can be obtained. In a similar way, this reconstruction operation may take place at the encoder to obtain a reconstructed attribute.

Various attribute prediction techniques can be employed in various embodiments to determine the attribute prediction. Typically, the attribute prediction of the current point is performed using previously reconstructed attributes of points neighboring the current point. When the attribute prediction process is started, based on the LOD-based order, reconstructed attribute values of points prior to the current point are already available. In addition, from the octree coding or decoding process, positions (3D coordinates) of the points in the point cloud are also available. Accordingly, the attribute prediction process can be performed with the knowledge of the reconstructed attributes and 3D coordinates of the neighboring points of the current point.

For example, a set of neighboring points of the current point can first be determined using various algorithms. In one example, a k-d tree structure based searching process can be performed to determine a set of points nearest to the current point.

For example, a geometric distance and/or attribute distance based approach is used to determine the attribute prediction. The prediction attribute can be determined based on a weighted sum (or weighted average) of reconstructed attributes of a set of determined neighboring points at the encoder or decoder. For example, with the set of determined neighboring points, the weighted sum (or weighted average) of the reconstructed attributes of the determined neighboring points can be determined to be the prediction attribute at the encoder or decoder. For example, a weight used in the weighted sum based technique (also referred to as an interpolation based technique) can be an inverse of (or inversely proportional to) a geometric distance, or an attribute distance. Alternatively, the weight can be a bilateral weight derived from a combination of a geometric distance based weight (a geometric eight) and an attribute-distance based weight (an attribute weight).

For example, a rate-distortion (RD) based approach is used to determine the attribute prediction. For example, a candidate index may be associated with each reconstructed attribute value of the set of neighboring points at the encoder or decoder. At the encoder, an RD optimization based process can be performed to evaluate which one of the candidate reconstructed attribute values of the neighboring points is the best choice to be used as the attribute prediction. For example, a distortion can be measured by a difference between the original (or true) attribute value of the current point and a candidate prediction (candidate reconstructed attribute value). A rate can be a cost of encoding the index of the selected candidate prediction. A Lagrangian RD-cost function can be defined to determine the best prediction signal candidate. A candidate index of the selected candidate prediction can thus be signaled to the decoder.

Accordingly, the decoder may first determine a same set of neighboring points of a respective current point, and associate indices to the reconstructed attribute values of the same set of neighboring points in a similar way as the encoder side. Then, the decoder can determine an attribute prediction from the reconstructed attribute values of the neighboring points using the signaled candidate index.

7. Coding System Examples of Point Cloud Compression

Figure 3:
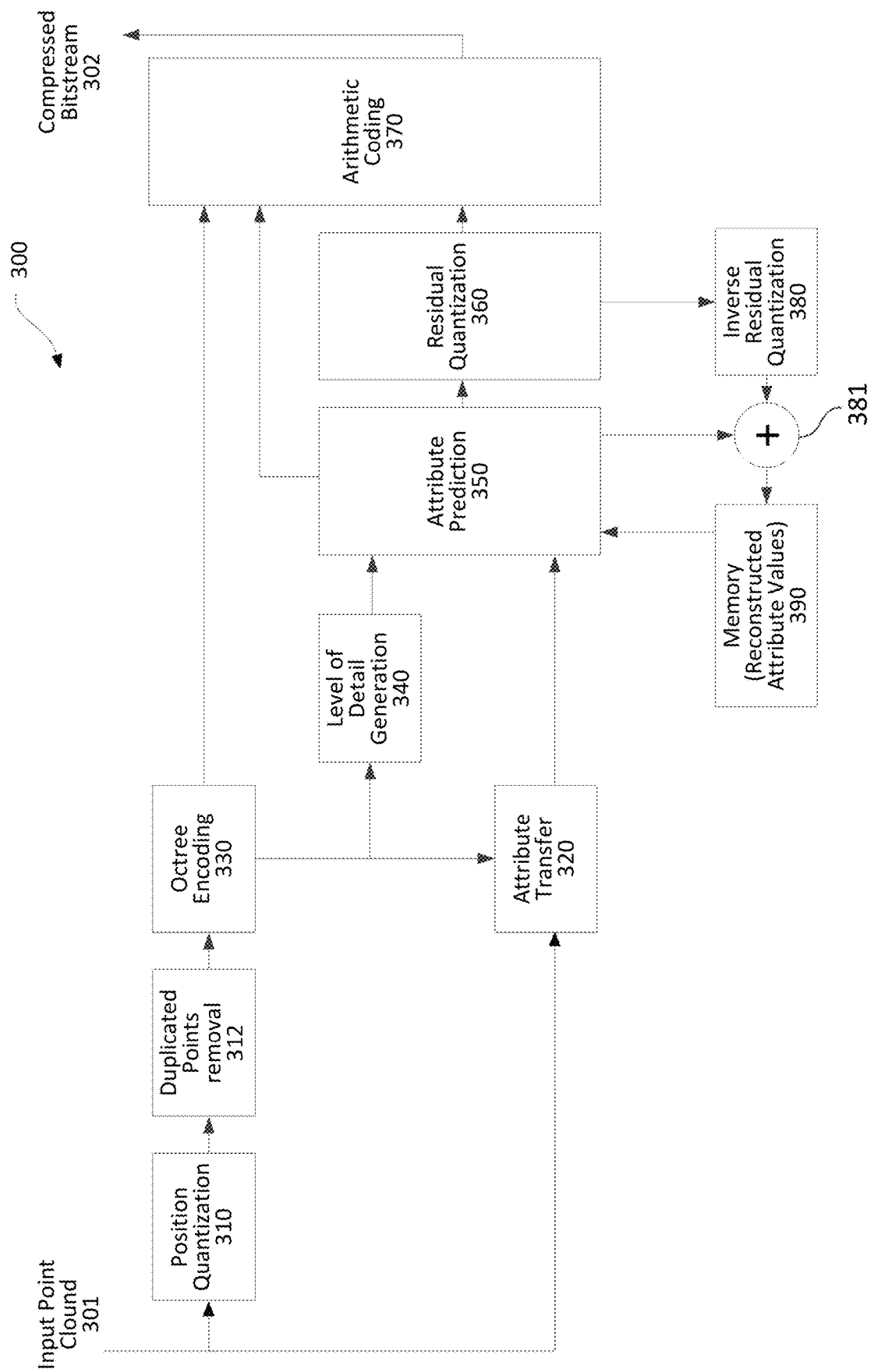
FIG. 3 shows an exemplary encoder in accordance with an embodiment.

FIG. 3 shows an exemplary encoder (300) in accordance with an embodiment. The encoder can be configured to receive point cloud data and compress the point cloud data to generate a bit stream carrying compressed point cloud data. In an embodiment, the encoder (300) can include a position quantization module (310), a duplicated points removal module (312), an octree encoding module (330), an attribute transfer module (320), an LOD generation module (340), an attribute prediction module (350), a residual quantization module (360), an arithmetic coding module (370), an inverse residual quantization module (380), an addition module (381), and a memory (390) to store reconstructed attribute values.

As shown, an input point cloud (301) can be received at the encoder (300). Positions (3D coordinates) of the point cloud (301) are provided to the quantization module (310). The quantization module (310) is configured to quantize the coordinates to generate quantized positions. The optional duplicated points removal module (312) is configured to receive the quantized positions and perform a filter process to identify and remove duplicated points. The octree encoding module (330) is configured to receive filtered positions from the duplicated points removal module, and perform an octree-based encoding process to generate a sequence of occupancy codes that describe a 3D grid of voxels. The occupancy codes are provided to the arithmetic coding module (370).

The attribute transfer module (320) is configured to receive attributes of the input point cloud, and perform an attribute transfer process to determine an attribute value for each voxel when multiple attribute values are associated with the respective voxel. The attribute transfer process can be performed on the re-ordered points output from the octree encoding module (330). The attributes after the transfer operations are provided to the attribute prediction module (350). The LOD generation module (340) is configured to operate on the re-ordered points output from the octree encoding module (330), and re-organize the points into different LODs. LOD information is supplied to the attribute prediction module (350).

The attribute prediction module (350) processes the points according to an LOD-based order indicated by the LOD information from the LOD generation module (340). The attribute prediction module (350) generates an attribute prediction for a current point based on reconstructed attributes of a set of neighboring points of the current point stored in the memory (390). Prediction residuals can subsequently be obtained based on original attribute values received from the attribute transfer module (320) and locally generated attribute predictions. When candidate indices are used in the respective attribute prediction process, an index corresponding to a selected prediction candidate may be provided to the arithmetic coding module (370).

The residual quantization module (360) is configured to receive the prediction residuals from the attribute prediction module (350), and perform quantization to generate quantized residuals. The quantized residuals are provided to the arithmetic coding module (370).

The inverse residual quantization module (380) is configured to receive the quantized residuals from the residual quantization module (360), and generate reconstructed prediction residuals by performing an inverse of the quantization operations performed at the residual quantization module (360). The addition module (381) is configured to receive the reconstructed prediction residuals from the inverse residual quantization module (380), and the respective attribute predictions from the attribute prediction module (350). By combining the reconstructed prediction residuals and the attribute predictions, the reconstructed attribute values are generated and stored to the memory (390).

The arithmetic coding module (370) is configured to receive the occupancy codes, the candidate indices (if used), the quantized residuals (if generated), and other information, and perform entropy encoding to further compress the received values or information. As a result, a compressed bitstream (302) carrying the compressed information can be generated. The bitstream (302) may be transmitted, or otherwise provided, to a decoder that decodes the compressed bitstream, or may be stored in a storage device. A bitstream can refer to a sequence of bits that forms a representation of coded point cloud frames. A coded point cloud frame can refer to a coded representation of a point cloud frame.

Figure 4:
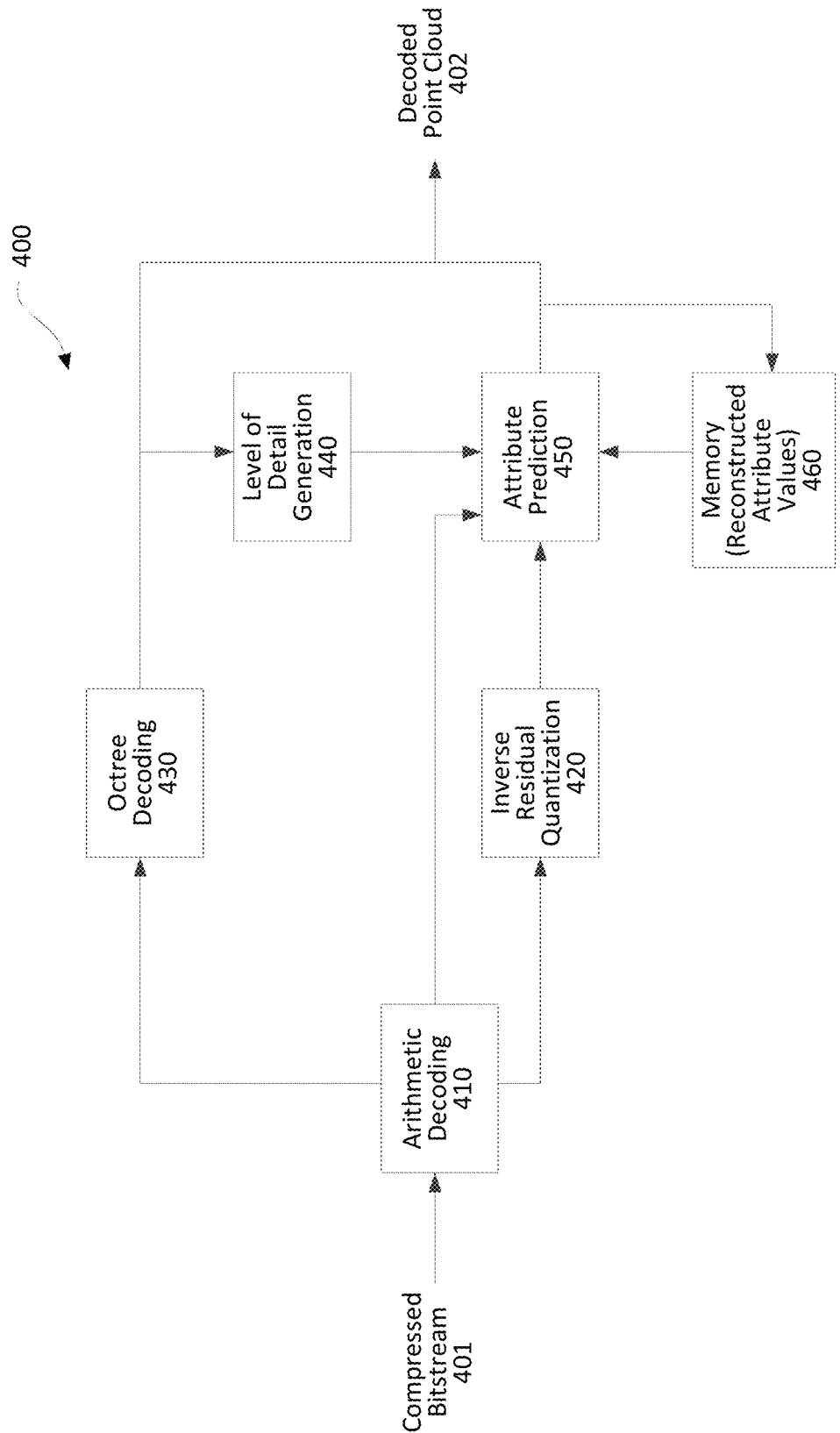
FIG. 4 shows an exemplary decoder in accordance with an embodiment.

FIG. 4 shows an exemplary decoder (400) in accordance with an embodiment. The decoder (400) can be configured to receive a compressed bitstream and perform point cloud data decompression to decompress the bitstream to generate decoded point cloud data. In an embodiment, the decoder (400) can include an arithmetic decoding module (410), an inverse residual quantization module (420), an octree decoding module (430), an LOD generation module (440), an attribute prediction module (450), and a memory (460) to store reconstructed attribute values.

As shown, a compressed bitstream (401) can be received at the arithmetic decoding module (410). The arithmetic decoding module (410) is configured to decode the compressed bitstream (401) to obtain quantized residuals (if generated) and occupancy codes of a point cloud. The octree decoding module (430) is configured to determine reconstructed positions of points in the point cloud according to the occupancy codes. The LOD generation module (440) is configured to re-organize the points into different LODs based on the reconstructed positions, and determine an LOD-based order. The inverse residual quantization module (420) is configured to generate reconstructed residuals based on the quantized residuals received from the arithmetic decoding module (410).

The attribute prediction module (450) is configured to perform an attribute prediction process to determine attribute predictions for the points according to the LOD-based order. For example, an attribute prediction of a current point can be determined based on reconstructed attribute values of neighboring points of the current point stored in the memory (460). The attribute prediction module (450) can combine the attribute prediction with a respective reconstructed residual to generate a reconstructed attribute for the current point.

A sequence of reconstructed attributes generated from the attribute prediction module (450) together with the reconstructed positions generated from the octree decoding module (430) corresponds to a decoded point cloud (402) that is output from the decoder (400) in one example. In addition, the reconstructed attributes are also stored into the memory (460) and can be subsequently used for deriving attribute predictions for subsequent points.

In various embodiments, the encoder (300) and decoder (400) can be implemented with hardware, software, or combination thereof. For example, the encoder (300) and decoder (400) can be implemented with processing circuitry such as one or more integrated circuits (ICs) that operate with or without software, such as an application specific integrated circuit (ASIC), field programmable gate array (FPGA), and the like. For another example, the encoder (300) and decoder (400) can be implemented as software or firmware including instructions stored in a non-volatile (or non-transitory) computer-readable storage medium. The instructions, when executed by processing circuitry, such as one or more processors, causing the processing circuitry to perform functions of the encoder (300) and decoder (400).

It is noted that the elements in the encoder (300) and decoder (400) configured to implement various techniques disclosed herein can be included in other decoders or encoders that may have similar or different structures from what is shown in FIG. 3 and FIG. 4. In addition, the encoder (300) and decoder (400) can be included in a same device, or separate devices in various examples.

II. G-PCC in Test Model 13 (TMC13)

G-PCC addresses the compression of point clouds in both Category 1 (static point clouds) and Category 3 (dynamically acquired point clouds). A test model called TMC13 has been developed by the Moving Picture Experts Group (MPEG) as a basis for studying potential pint cloud coding technologies. The TMC13 model separately compresses geometry and associated attributes such as color or reflectance. The geometry, which is the 3D coordinates of the point clouds, is coded by octree partition. The attributes are then compressed based on reconstructed geometry using prediction and lifting techniques.

1. Octree Partition and Coding Occupancy Information in Current TMC13 Design

Figure 5:
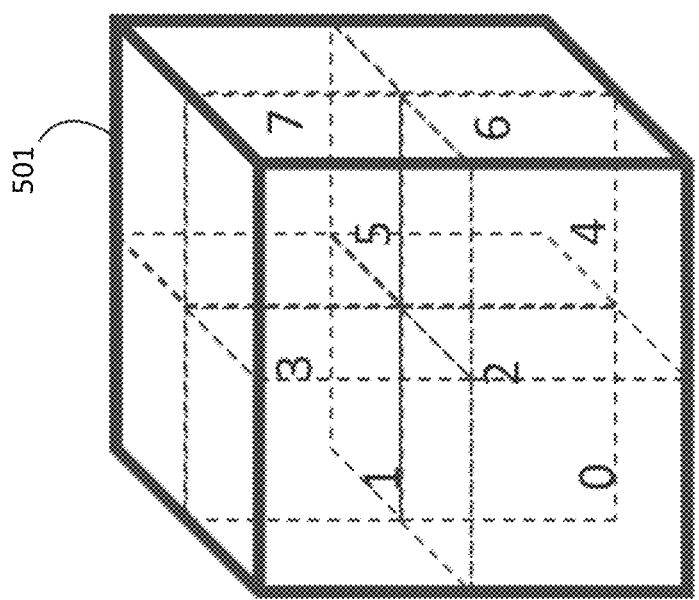
FIG. 5 shows an octree partition in three-dimensional (3D) space.

Evenly partitioning of a 3D cube would generate eight sub-cubes, which is known as the octree (OT) partition in point cloud compression (PCC). The OT partition resembles a binary-tree (BT) partition in one-dimensional and a quadtree (QT) partition in two-dimensional space. The OT partition is illustrated in FIG. 5, where a 3D cube (501) in solid line is partitioned into eight smaller equal-sized cubes in dashed line. The left side 4 cubes are associated with indices of 0-3, while the right side 4 cubes are associated with indices of 4-7.

In TMC13, if an Octree geometry codec is used, a geometry encoding proceeds as follows. First, a cubical axis-aligned bounding box B is defined by the two points $(0,0,0)$ and $(2^d, 2^d, 2^d)$, where $2^d$ defines the size of B and d is encoded in the bitstream. It assumes all the points need to be compressed are inside the defined bounding box B.

An octree structure is then built by recursively subdividing B. At each stage, a cube is subdivided into 8 sub-cubes. The size of a sub-cube after iterative subdivision k (k≤d) times would be ($2^{d-k}$, $2^{d-k}$, $2^{d-k}$). An 8-bit code, namely an occupancy code, is then generated by associating a 1-bit value with each sub-cube in order to indicate whether it contains points (i.e., full and has value 1) or not (i.e., empty and has value 0). Only full sub-cubes with a size greater than 1 (i.e., non-voxels) are further subdivided. The occupancy code for each cube can be then compressed by an arithmetic encoder.

Figure 6:
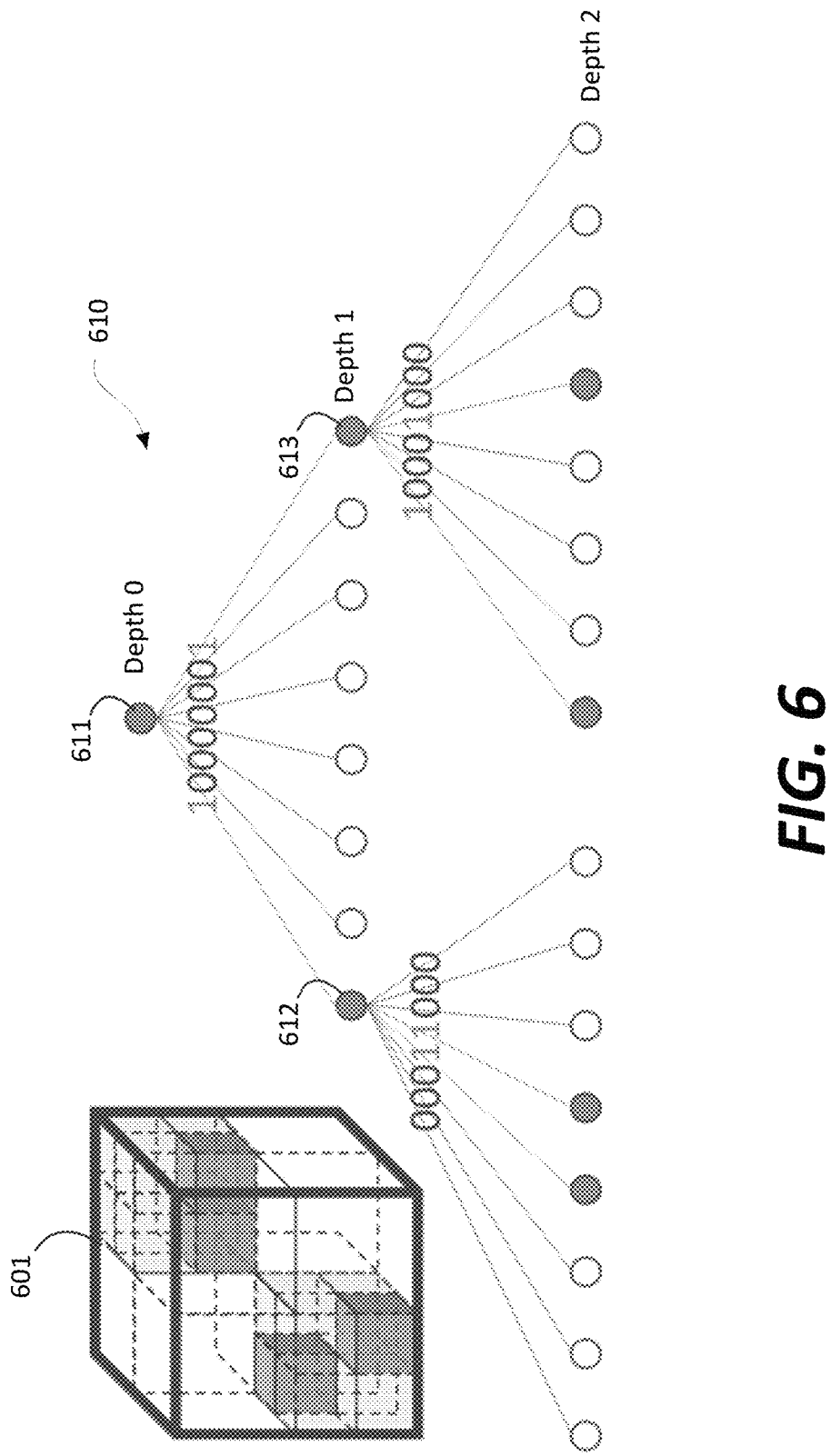
FIG. 6 shows an example of two-level octree (OT) partition and corresponding occupancy codes.

The decoding process starts by reading from a bitstream the dimensions of the bounding box B. The same octree structure is then built by subdividing B according to the decoded occupancy codes. An example of two-level OT partition and corresponding occupancy codes is shown in FIG. 6, where cubes and nodes in dark indicate they are occupied by points.

As shown, a cube (601) is partitioned into 8 sub-cubes. With the same indexing method used in FIG. 5, the 0-th and 7-th sub-cubes are each further partitioned into 8 sub-cubes. An octree (610) corresponding to the partitions to the cube (601) includes a root node (611) at the first level. The root node (611) is partitioned into 8 child nodes that can be indexed from 0 to 7. The 0-th and 7-th nodes (612-613) at the second level are further partitioned into 16 child nodes. The level of a node in the octree (610) can correspond to a number of hops from the root to the respective node, and can be referred to as depths of the octree (610). The depths 0-2 corresponding to the first to the third levels of the octree (610) are indicated in FIG. 6.

2. Encoding of Occupancy Codes

The occupancy code of each node can be compressed by an arithmetic encoder. The occupancy code can be denoted as S which is an 8-bin integer, and each bin in S indicates the occupancy status of each child node. Two encoding methods for occupancy code exist in TMC13, i.e., the bit-wise encoding and the byte-wise encoding methods, and the bit-wise encoding is enabled by default. Either way performs arithmetic coding with context modeling to encode the occupancy code, where the context status is initialized at the beginning of the whole coding process and is updated during the coding process.

For bit-wise encoding, eight bins in S are encoded in a certain order where each bin is encoded by referring to the occupancy status of neighboring nodes and child nodes of the neighboring nodes, where the neighboring nodes are at the same level of current node.

For byte-wise encoding, S is encoded by referring to an adaptive look up table (A-LUT), which keeps track of the N (e.g., 32) most frequent occupancy codes, and a cache which keeps track of the last different observed M (e.g., 16) occupancy codes.

A binary flag indicating whether S is in the A-LUT or not is encoded. If S is in the A-LUT, the index in the A-LUT is encoded by using a binary arithmetic encoder. If S is not in the A-LUT, then a binary flag indicating whether S is in the cache or not is encoded. If S is in the cache, then the binary representation of its index in the cache is encoded by using a binary arithmetic encoder. Otherwise, if S is not in the cache, then the binary representation of S is encoded by using a binary arithmetic encoder.

The decoding process starts by parsing the dimensions of the bounding box B from a bitstream. The same octree structure is then built by subdividing B according to the decoded occupancy codes.

III. Implicit Geometry Partition for Point Cloud Coding

1. The Problem

In the TMC13 design, the bounding box is restricted to be a cube B that has a same size for all dimensions, and OT partition is performed for full sub-cubes at each node by which the sub-cubes are halved in size of all dimensions. OT partition is performed recursively until a size of sub-cubes reaches one or there is no point contained in sub-cubes. However, this manner is not efficient for all cases, especially when the points are nonuniformly distributed in a 3D scene. One extreme case would be a 2D plane in 3D space, in which all the points locate on an x-y plane and variation in z-axis is zero. In this case, OT partition performed on the cube B as a starting point would waste a large number of bits to represent occupancy information in z-direction, which is redundant and useless. In real applications, the worst case may not occur often, however, it is typical to have a point cloud that has asymmetric bounding box, which has shorter lengths in some dimensions.

Figure 7:
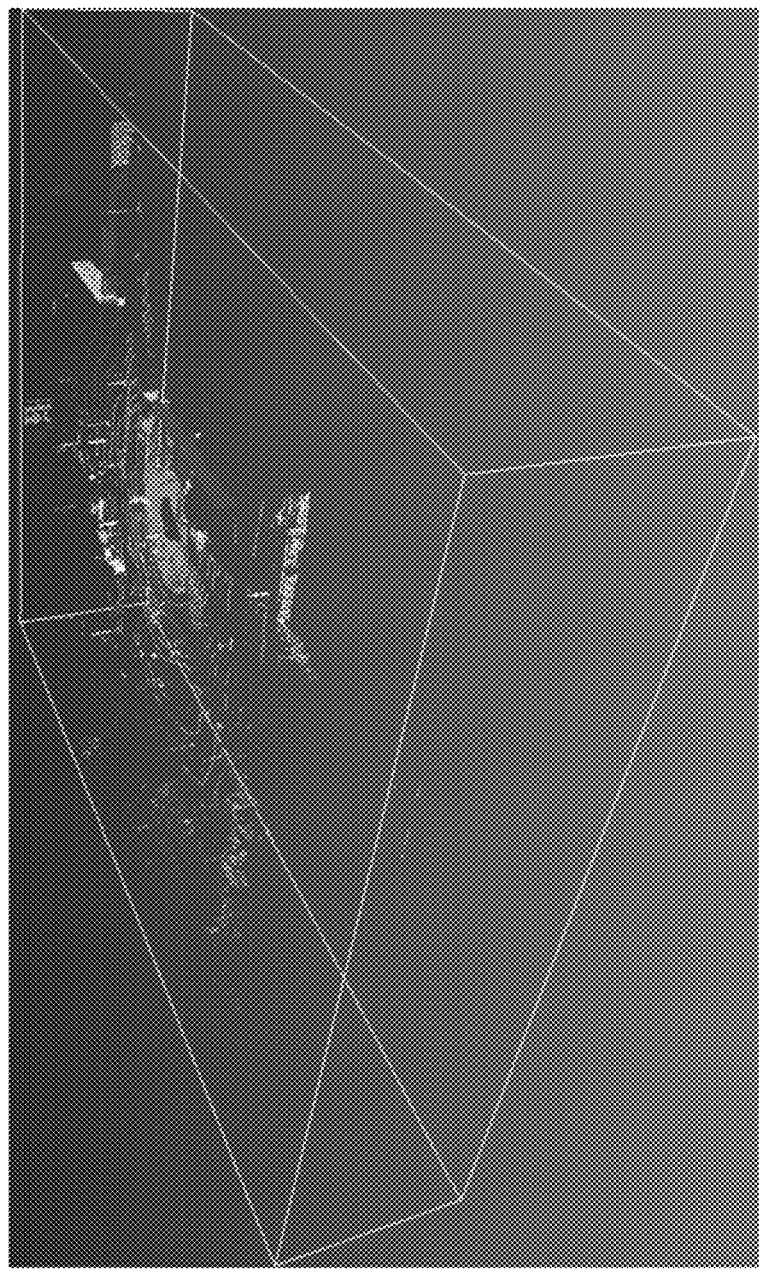
FIG. 7 shows a point cloud sequence having principle components in x and y directions.

As shown in FIG. 7, a point cloud sequence named "ford_01_vox1mm" used for testing in MPEG-PCC has its principle components in x and y directions. In fact, many point cloud data generated from a Lidar sensor have the same characteristics.

2. Implicit QT and BT Partitions

Aspects of the disclosure provide embodiments addressing partition of a rectangular-cuboid bounding box, where a cube or a node during partitioning can be implicitly determined to be QT or BT partitioned, instead of OT always. Occupancy bits indicating occupancy information can be saved from implicit QT and BT partitions.

Figure 8:
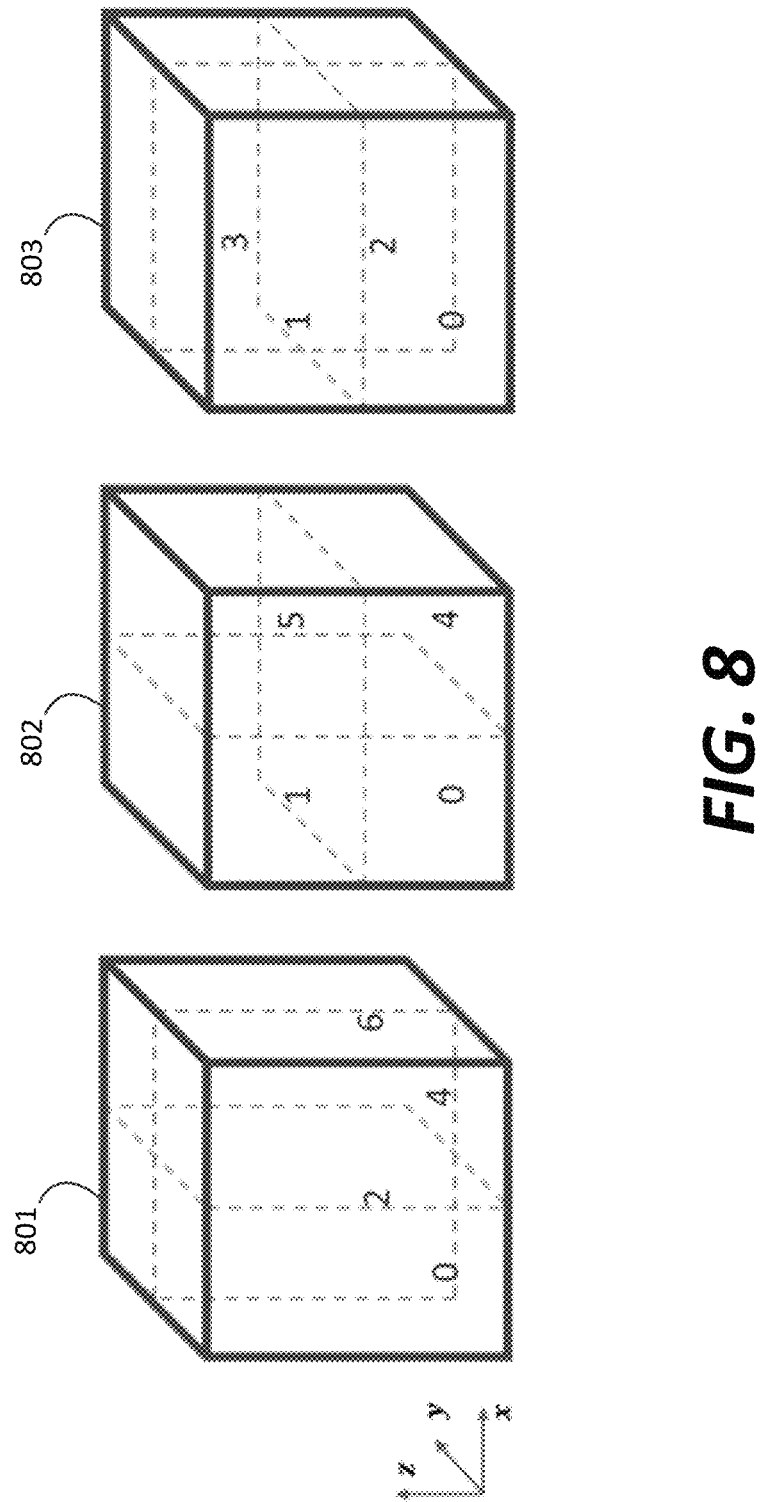
FIG. 8 shows examples of quadtree (QT) partitions in 3D space in accordance with an embodiment.
Figure 9:
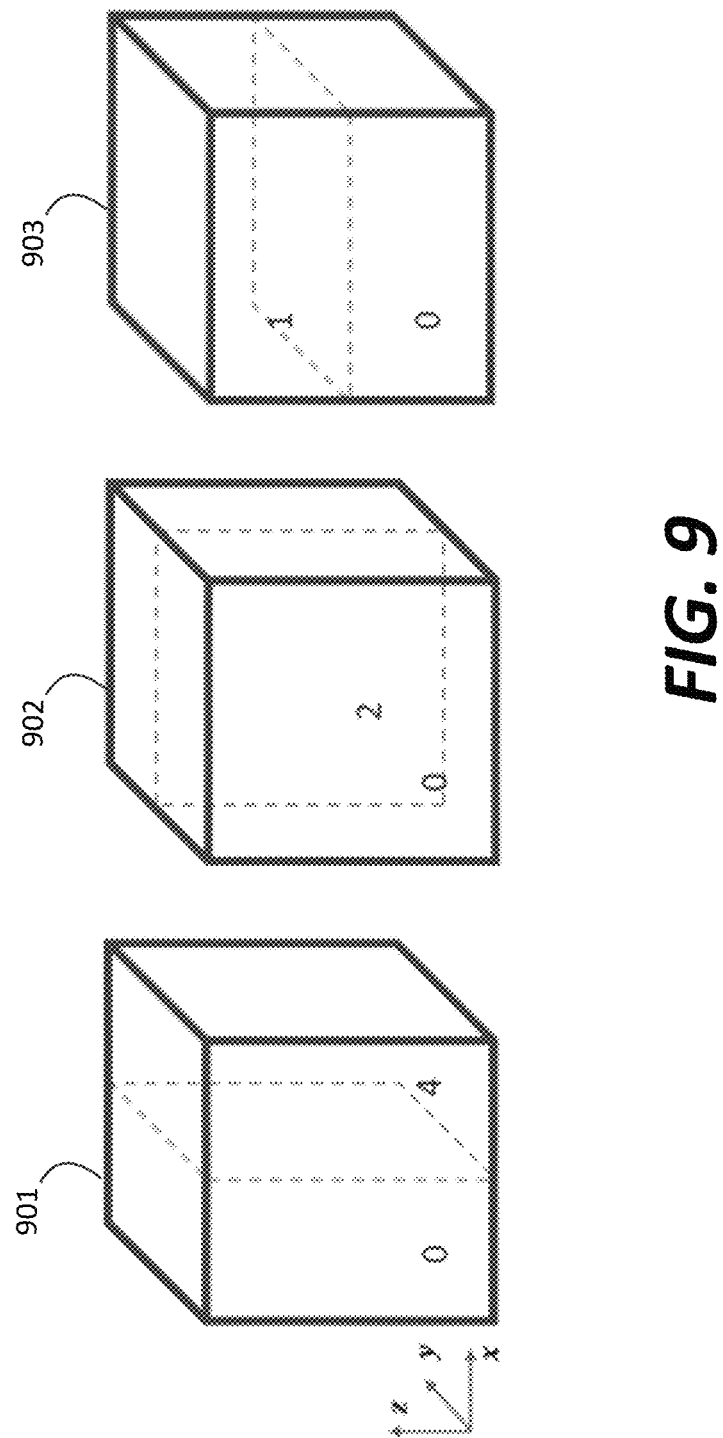
FIG. 9 shows examples of binary-tree (BT) partitions in 3D space in accordance with an embodiment.

For a bounding box that may not be a perfect cube, in some cases nodes in different levels may not be (or unable to be) partitioned along all directions. If a partition is performed on all three directions, the partition is a typical OT partition. If a partition is performed on two directions out of three, the partition is a QT partition in 3D space. If a partition is performed on one direction only, the partition is then a BT partition in 3D space. Examples of QT and BT partitions in 3D space are shown in FIG. 8 and FIG. 9, respectively. For demonstration, the figures show QT and BT partitions from a perfect cube, but it should be noted that it can be partitioned from any general rectangular cuboid forming a bounding box.

FIG. 8 shows three cubes (801-803) partitioned along x-y, x-z, and y-z axes (or directions), respectively. Sub-nodes in each cube (801-803) are assigned indices that is a subset of the 8 indices for indexing the 8 child nodes in OT partition in the FIG. 5 example. With the assigned indices, the QT partitions with three different directions can be represented using occupancy codes in an octree structure. For example, an occupancy code representing the QT partition along x-y axes to the cube (801) can take the form of x0x0x0x0, where a bit at position of x can be used to indicate an occupancy status (e.g., can take a value of 1 or 0). Similarly, an occupancy code representing the QT partition along x-z axes to the cube (802) can take the form of xx00xx00, while an occupancy code representing the QT partition along y-z axes to the cube (803) can take the form of xxxx0000. As shown, those indices assigned to the sub-cubes also indicate positions of bits corresponding to the resulting sub-nodes in an 8-bits occupancy code.

FIG. 9 show three cubes (901-903) partitioned along x, y, and z axis, respectively. In a similar manner to FIG. 8, sub-nodes in each cube (901-903) are assigned indices corresponding to positions in an occupancy code.

When pre-defined conditions are met, QT and BT partitions can be performed implicitly. "Implicitly" implies that no additional signaling bits are needed to indicate a QT or BT partition is used instead of an OT partition. A decoder can determine the type (e.g., QT or BT partition) and direction of the partition in the same way as the encoder based on the pre-defined conditions. Moreover, bits can be saved from an implicit QT or BT partition compared to an OT partition when signaling the occupancy information of each sub-node. A QT requires four bits, reducing from eight, to represent the occupancy status of four sub-nodes, while a BT only requires two bits. For example, as in the FIGS. 8-9 examples, bits in an occupancy code corresponding to the indices assigned to the sub-nodes can be signaled, while the other bits in the occupancy code irrelevant with the sub-nodes can be skipped (not signaled). Thus, an occupancy code can include skipped bits and signaled bits when QT and BT partitions are introduced.

It is noted that QT and BT partitions can be implemented in the same structure of OT partition. The context selection based on neighboring coded cubes and entropy encoder can be applied in similar ways. The context modeling of the occupancy code from a QT or BT may be changed according to the asymmetric shape of sub-nodes.

The encoding of occupancy codes of implicit QT and BT partitions can be described as in the following examples. First, one can assume that the occupancy code of an OT is encoded in the order of indices as shown in FIG. 5. Then, the occupancy code of a QT partition along x-y axes, as shown in the leftmost graph of FIG. 8 (cube (801)), can be coded by omitting the bits in positions 1, 3, 5, 7, as they can be inferred to be zeros at a decoder, and only the bits in positions 0, 2, 4, 6 are signaled. Similarly, for a BT along x axis, as shown in the leftmost graph of FIG. 9 (cube (901)), occupancy information in positions 0 and 4 can be signaled, and the other six bits can be inferred to be zeros.

In addition, the current TMC13 has a special mode for geometry coding, which is the direct mode (DM), and allows coding (x, y, z) positions in a sub-node directly without further partitions. For example, the positions are relative positions to the origin of current sub-node with fixed-length coding, where the bit length is determined by the dimension of current sub-node. Since the implicit partition may lead to sub-nodes with unequal sizes in (x, y, z) dimensions, the DM mode can be changed accordingly. For example, if a sub-node with the size of $(2^{d_x}, 2^{d_y}, 2^{d_z})$ is to be coded in DM mode, the relative positions of each point in the sub-nodes are coded by fixed-length coding with $(d_x, d_y, d_z)$ bits, respectively.

3. Signaling Rectangular Cuboid Bounding Box

First of all, a bounding box B is not restricted to be with a same size in all directions, instead the bounding box can be arbitrary-size rectangular cuboid to better fit the shape of a 3D scene or objects. In various embodiments, a size of the bounding box B can be represented as a power of two, i.e., $(2^{d_x}, 2^{d_y}, 2^{d_z})$. The $d_x$, $d_y$, and $d_z$ are referred to as log2 sizes of the bounding box. It is noted that $d_x$, $d_y$, $d_z$ are not assumed to be equal, and may be signaled separately in a sequence header (e.g., a sequence parameter set (SPS)) or a slice header of a bitstream.

In addition, it is worth noting that the size of the bounding box B can be any positive numbers without the limitation of being a power of two. FIG. 7 shows an example of a rectangular cuboid bounding box to wrap up the scene, where the z-direction has a smallest size.

In Section III of the detailed description of embodiments, some embodiments are shown to be changes to standard specifications of the draft for Geometry-based Point Cloud Compression, ISO/IEC 23090-9:2019(E),WD stage, ISO/IEC JTC 1/SC 29/WG 11 W18179, March 2019.

Embodiment A

In one embodiment, the bounding box sizes of three dimensions may be signaled in a geometry slice header in the form of log2 as shown in Table 1. The geometry slice header can include syntax elements applied to a slice. Generally, a slice can refer to a series of syntax elements representing a part of or entire coded point cloud frame. Points of a slice can be contained in a bounding box corresponding to the slice.

TABLE 1

| # | | Descriptor |
|---|---|---|
| | geometry_slice_header( ) { | |
| 1 | gsh_geometry_parameter_set_id | ue(v) |
| 2 | gsh_tile_id | ue(v) |
| 3 | gsh_slice_id | ue(v) |
| 4 | if( gps_box_present_flag ) { | |
| 5 | gsh_box_log2_sc,ale | ue(v) |
| 6 | gsh_box_origin_x | ue(v) |
| 7 | gsh_box_origin_y | ue(v) |
| 8 | gsh_box_origin_z | ue(v) |
| 9 | } | |
| 10 * | gsh_log2_max_nodesize_x | ue(v) |
| 11 * | gsh_log2_max_nodesize_y | ue(v) |
| 12 * | gsh_log2_max_nodesize_z | ue(v) |
| 13 | gsh_points_number | ue(v) |
| 14 | byte_alignment( ) | |
| 15 | } | |

The geometry slice header syntax in Table 1 is modified by adding the following syntax elements at rows 10-12:

gsh_log2_max_nodesize_x specifies the bounding box size in x dimension, i.e., MaxNodesizeX that is used in the decoding process as follows:

MaxNodeSizeX=$2^{gsh\_log2\_max\_nodesize\_x}$.

MaxNodeSizeLog2X=gsh_log2_max_nodesize_x.

gsh_log2_max_nodesize_y specifies the bounding box size in y dimension, i.e., MaxNodesizeY that is used in the decoding process as follows:

MaxNodeSizeY=$2^{gsh\_log2\_max\_nodesize\_y}$.

MaxNodeSizeLog2Y=gsh_log2_max_nodesizey.

gsh_log2_max_nodesize_z specifies the bounding box size in z dimension, i.e., MaxNodesizeZ that is used in the decoding process as follows:

MaxNodeSizeZ=$2^{gsh\_log2\_max\_nodesize\_z}$.

MaxNodeSizeLog2Z=gsh_log2_max_nodesize_z.

Embodiment B

In another embodiment, the sizes of three dimensions may be signaled in a geometry slice header in the form of log2. Instead of signaling the three values independently, one can signal by their differences as follows.

TABLE 2

| # | | Descriptor |
|---|---|---|
| | geometry_slice_header( ) { | |
| 1 | gsh_geometry_parameter_set_id | ue (v) |
| 2 | gsh_tile_id | ue (v) |
| 3 | gsh_slice_id | ue (v) |
| 4 | if( gps_box_present_flag ) { | |
| 5 | gsh_box_log2ficale | ue (v) |
| 6 | gsh_box_origin_x | ue (v) |
| 7 | gsh_box_origin_y | ue (v) |
| 8 | gsh_box_origin_z | ue (v) |
| 9 | } | |
| 10 * | gsh_log2_max_nodesize_x | ue (v) |
| 11 * | gsh_log2_max_nodesize_y_minus_x | se(v) |
| 12 * | gsh_log2_max_nodesize_z_minus_y | s qv) |
| 13 | gsh_points_number | ue(v) |
| 14 | byte_alignment( ) | |
| 15 | } | |

The geometry slice header syntax in Table 2 is modified by adding the following syntax elements at rows 10-12:

gsh_log2_max_nodesize_x specifies the bounding box size in x dimension, i.e., MaxNodesizeX that is used in the decoding process as follows:

MaxNodeSizeX=$2^{gsh\_log2\_max\_nodesize\_x}$.

MaxNodeSizeLog2X=gsh_log2_max_nodesize_x.

gsh_log2_max_nodesize_y_minus_x specifies the bounding box size in y dimension, i.e., MaxNodesizeY that is used in the decoding process as follows:

MaxNodeSizeY=$2^{gsh\_log2\_max\_nodesize\_y\_minus\_x+gsh\_log2\_max\_nodesize\_x}$.

MaxNodeSizeLog2Y=gsh_log2_max_nodesizey_minus_x+ gsh_log2_max_nodesize_x.

gsh_log2_max_nodesize_z_minus_y specifies the bounding box size in z dimension, i.e., MaxNodesizeZ that is used in the decoding process as follows:

MaxNodeSizeZ=$2^{gsh\_log2\_max\_nodesize\_z\_minus\_y+MaxNodeSizeLog2Y}$.

MaxNodeSizeLog2Z=gsh_log2_max_nodesize_z_minus_y+ MaxNodeSizeLog2Y.

Embodiment C

In another embodiment, the sizes of three dimensions may be signaled in a geometry slice header by their Cartesian positions as follows.

TABLE 3

| # | | Descriptor |
|---|---|---|
| | geometry_slice_header( ) { | |
| 1 | gsh_geomeny_parameter_set_id | ue (v) |
| 2 | gsh_tile_id | ue (v) |
| 3 | gsh_slice_id | ue (v) |
| 4 | if( gps_box_present_flag ) { | |
| 5 | gsh_box_log2_scale | ue (v) |
| 6 | gsh_box_origin_x | ue (v) |
| 7 | gsh_box_origin_y | ue (v) |
| 8 | gsh_box_origin_z | ue (v) |
| 9 | } | |
| 10 * | gsh_max_nodesize_x | ue (v) |
| 11 * | gsh_max_nodesize_y | ue (v) |
| 12 * | gsh_max_nodesize_z | ue (v) |
| 13 | gsh_points_number | ue (v) |
| 14 | byte...alignment( ) | |
| 15 | } | |

The geometry slice header syntax in Table 3 is modified by adding the following syntax elements at rows 10-12:

gsh_max_nodesize_x specifies the bounding box size in x dimension, i.e., MaxNodeSizeX that is used in the decoding process as follows:

MaxNodeSizeX=gsh_max_nodesize_x.

MaxNodeSizeLog2X=ilog2(MaxNodeSizeX).

where ilog2(v) calculates the smallest integer that is larger than or equal to the log2 of v.

gsh_max_nodesize_y specifies the bounding box size in y dimension, i.e., MaxNodeSizeY that is used in the decoding process as follows:

MaxNodeSizeY=gsh_max_nodesizey.

MaxNodeSizeLog2Y=ilog2(MaxNodeSizeY).

gsh_max_nodesize_z specifies the bounding box size in z dimension, i.e., MaxNodeSizeZ that is used in the decoding process as follows:

MaxNodeSizeZ=gsh_max_nodesize_z.

MaxNodeSizeLog2Z=ilog2(MaxNodeSizeZ).

Embodiment D

In another embodiment, the sizes of three dimensions may be signaled in a geometry slice header by their Cartesian positions minus one as follows.

TABLE 4

| # | | Descriptor |
|---|---|---|
| | geometry_slice_header( ) { | |
| 1 | gsh_geometry_parameter_set_id | ue (v) |
| 2 | gsh_tile_id | ue (v) |
| 3 | gsh_slice_id | ue (v) |
| 4 | if( gps_box_present_flag ) { | |
| 5 | gsh_box_log2_scale | ue (v) |
| 6 | gsh_box_origin_x | ue (v) |
| 7 | gsh_box_origin_y | ue (v) |
| 8 | gsh_box_origin_z | ue (v) |
| 9 | } | |
| 10 * | gsh_max_nodesize_x_minus_one | ue (v) |
| 11 * | gsh_max_nodesize_y_minus_one | ue (v) |
| 12 * | gsh_max_nodesize_z_minus_one | ue (v) |
| 13 | gsh_points_number | ue (v) |
| 14 | byte_alignment( ) | |
| 15 | } | |

The geometry slice header syntax in Table 4 is modified by adding the following syntax elements at rows 10-12:

gsh_max_nodesize_x_minus_one specifies the bounding box size in x dimension, i.e., MaxNodeSizeX that is used in the decoding process as follows:

MaxNodeSizeX=gsh_max_nodesize_x_minus_one+1.

MaxNodeSizeLog2X=ilog2(MaxNodeSizeX).

gsh_max_nodesize_y_minus_one specifies the bounding box size in y dimension, i.e., MaxNodeSizeY that is used in the decoding process as follows:

MaxNodeSizeY=gsh_max_nodesizey_minus_one+1.

MaxNodeSizeLog2Y=ilog2(MaxNodeSizeY).

gsh_max_nodesize_z_minus_one specifies the bounding box size in z dimension, i.e., MaxNodeSizeZ that is used in the decoding process as follows:

MaxNodeSizeZ=gsh_max_nodesize_z_minus_one+1.

MaxNodeSizeLog2Z=ilog2(MaxNodeSizeZ).

Embodiment E

In another embodiment, only one dimension out of three allows to have different sizes. In this case, the sizes of x and y dimensions are same, and z dimension can be different, therefore two values are signaled in the geometry slice header in the form of log2 as follows.

TABLE 5

| # | | Descriptor |
|---|---|---|
| | geometry_slice_header( ) { | |
| 1 | gsh_geometry_parameter_set_id | ue (v) |
| 2 | gsh_tile_id | ue (v) |
| 3 | gsh_slice_id | ue (v) |
| 4 | if( gps_box_present_flag ) { | |
| 5 | gsh_box_log2_scale | ue (v) |
| 6 | gsh_box_origin_x | ue (v) |
| 7 | gsh_box_origin_y | ue (v) |
| 8 | gsh_box_origin_z | ue (v) |
| 9 | } | |
| 10 * | gsh_log2_max_nodesize_x_y | ue (v) |
| 11 * | gsh_log2_max_nodesize_z | ue (v) |
| 12 | gsh_points_number | ue (v) |
| 13 | byte_alignment( ) | |
| 14 | } | |

The geometry slice header syntax in Table 5 is modified by adding the following syntax elements at rows 10-11:

gsh_log2_max_nodesize_x_y specifies the bounding box size in x and y dimensions, i.e., MaxNodesizeX and MaxNodesizeY that are used in the decoding process as follows:

MaxNodeSizeX=MaxNodeSizeY= $2^{gsh\_log2\_max\_nodesize\_x\_y}$.

MaxNodeSizeLog2X=MaxNodeSizeLog2Y=gsh_log2_max_nodesize_x_y.

gsh_log2_max_nodesize_z specifies the bounding box size in z dimension, i.e., MaxNodesizeZ that is used in the decoding process as follows:

MaxNodeSizeZ=$2^{gsh\_log2\_max\_nodesize\_z}$.

MaxNodeSizeLog2Z=gsh_log2_max_nodesize_z.

Embodiment F

In another embodiment, only one dimension out of three allows to have different sizes. In this case, the sizes of x and y dimensions are same, and z dimension can be different, therefore two values are signaled in a geometry slice header in the form of log2. Instead of signaling the two values independently, one can signal by their differences as follows.

TABLE 6

| # | | Descriptor |
|---|---|---|
| | geometry_slice_header( ) { | |
| 1 | gsh_geometry_parameter_set_id | ue(v) |
| 2 | gsh_tile_id | ue(v) |
| 3 | gsh_slice_id | ue(v) |
| 4 | if( gps_box_present_flag ) { | |
| 5 | gsh_box_log2_scale | ue(v) |
| 6 | gsh_box_origin_x | ue(v) |
| 7 | gsh_box_origin_y | ue(v) |
| 8 | gsh_box_origin_z | ue(v) |
| 9 | } | ue(v) |
| 10 * | gsh_log2_max_nodesize_x_y | ue(v) |
| 11 * | gsh_log2_max_nodesize_z_minus_xy | ue(v) |
| 12 | gsh_points_number | ue(v) |
| 13 | byte_alignment( ) | |
| 14 | } | |

The geometry slice header syntax in Table 6 is modified by adding the following syntax elements at rows 10-11:

gsh_log2_max_nodesize_x_y specifies the bounding box size in x and y dimensions, i.e., MaxNodesizeX and MaxNodesizeY that are used in the decoding process as follows:

MaxNodeSizeX=MaxNodeSizeY= $2^{gsh\_log2\_max\_nodesize\_x\_y}$.

MaxNodeSizeLog2X=MaxNodeSizeLog2Y=gsh_log2_max_nodesize_x_y.

gsh_log2_max_nodesize_z_minus_xy specifies the bounding box size in z dimension, i.e., MaxNodesizeZ that is used in the decoding process as follows:

MaxNodeSizeZ= $2^{gsh\_log2\_max\_nodesize\_z\_minus\_xy+gsh\_log2\_max\_nodesize\_x\_y}$.

MaxNodeSizeLog2Z=gsh_log2_max_nodesize_z_minus_xy+ gsh_log2_max_nodesize_xy.

Embodiment G

In another embodiment, only one dimension out of three allows to have different sizes. In this case, the sizes of x and y dimensions are same, and z dimension can be different, therefore two values are signaled in a geometry slice header by their Cartesian positions as follows.

TABLE 7

| # | | Descriptor |
|---|---|---|
| | geometry_slice_header( ) { | |
| 1 | gsh_geometry_parameter_set_id | ue(v) |
| 2 | gsh_tile_id | ue(v) |
| 3 | gsh_slice_id | ue(v) |
| 4 | if( gps_box_present_flag ) { | |
| 5 | gsh_box_log2_scale | ue(v) |
| 6 | gsh_box_origin_x | ue(v) |
| 7 | gsh_box_origin_y | ue(v) |
| 8 | gsh_box_origin_z | ue(v) |
| 9 | } | |
| 10 * | gsh_max_nodesize_x_y | ue(v) |
| 11 * | gsh_max_nodesize_z | ue(v) |
| 12 | gsh_points_number | ue(v) |
| 13 | byte_alignment( ) | |
| 14 | } | |

The geometry slice header syntax in Table 7 is modified by adding the following syntax elements at rows 10-11:

gsh_max_nodesize_x_y specifies the bounding box size in x and y dimensions, i.e., MaxNodesizeX and MaxNodesizeY that are used in the decoding process as follows:

MaxNodeSizeX=MaxNodeSizeY=gsh_max_nodesize_xy.

MaxNodeSizeLog2X=MaxNodeSizeLog2Y= ilog2(gsh_max_nodesize_xy).

gsh_max_nodesize_z specifies the bounding box size in z dimension, i.e., MaxNodeSizeZ that is used in the decoding process as follows:

MaxNodeSizeZ=gsh_max_nodesize_z.

MaxNodeSizeLog2Z=ilog2(gsh_max_nodesize_z).

Embodiment H

In another embodiment, only one dimension out of three allows to have different sizes. In this case, the sizes of x and y dimensions are same, and z dimension can be different, therefore two values are signaled in the geometry slice header by their Cartesian positions minus one as follows.

TABLE 8

| # | | Descriptor |
|---|---|---|
| | geometry_slice_header( ) { | |
| 1 | gsh_geometry_parameter_set_id | ue(v) |
| 2 | gsh_tile_id | ue(v) |
| 3 | gsh_slice_id | ue(v) |
| 4 | if( gps_box_present_flag ) { | |
| 5 | gsh_box_log2_scale | ue(v) |
| 6 | gsh_box_origin_x | ue(v) |
| 7 | gsh_box_origin_y | ue(v) |
| 8 | gsh_box_origin_z | ue(v) |
| 9 | } | |
| 10 * | gsh_max_nodesize_x_y_minus_one | ue(v) |
| 11 * | gsh_max_nodesize_z_minus_one | ue(v) |
| 12 | gsh_points_number | ue(v) |
| 13 | byte_alignment( ) | |
| 14 | } | |

The geometry slice header syntax in Table 8 is modified by adding the following syntax elements at rows 10-11:

gsh_max_nodesize_x_y_minus_one specifies the bounding box size in x and y dimensions, i.e., MaxNodesizeX and MaxNodesizeY that are used in the decoding process as follows:

MaxNodeSizeX=MaxNodeSizeY=gsh_max_nodesize_xy_minus_one+1.
MaxNodeSizeLog2X=MaxNodeSizeLog2Y=ilog2(gsh_max_nodesize_xy_minus_one+1).

gsh_max_nodesize_z_minus_one specifies the bounding box size in z dimension, i.e., MaxNodeSizeZ that is used in the decoding process as follows:

MaxNodeSizeZ=gsh_max_nodesize_z_minus_one+1.
MaxNodeSizeLog2Z=ilog2(gsh_max_nodesize_z_minus_one+1).

4. Signaling of Implicit QT and BT Partition

Embodiment A

In one embodiment, the geometry coding syntax is as follows.

TABLE 9

| # | | Descriptor |
|---|---|---|
| | geometry_slice_data( ) { | |
| 1 | for( depth = 0; depth < MaxGeometryOctreeDepth; depth++ ) { | |
| 2 | for( nodeIdx = 0; nodeIdx < NumNodesAtDepth[ depth ]; nodeIdx++ ) { | |
| 3 * | /* NB: implicit partition is described in semantics */ | |
| 4 * | partitionSkip = b$_x$b$_y$b$_z$ // depend on implicit partition conditions | |
| 5 * | If ( !(partitionSkip & 4) ) | |
| 6 * | depthX = depthX + 1; | |
| 7 * | If ( !(partitionSkip & 2) ) | |
| 8 * | depthY = depthY + 1; | |
| 9 * | If ( !(partitionSkip & 1) ) | |
| 10 * | depthZ = depthZ + 1; | |
| 11 * | xN = NodeX[ depthX ][ nodeIdx ] | |
| 12 * | yN = NodeY[ depthY ][ nodeIdx ] | |
| 13 * | zN = NodeZ[ depthZ ][ nodeIdx ] | |
| 14 * | geometry_node( depthX, depthY, depthZ, partitionSkip, nodeIdx, xN, yN, zN ) | |
| 15 | } | |
| 16 | } | |
| 17 | if ( log2_trisoup_node_size > 0 ) | |
| 18 | geometry_trisoup_data( ) | |
| 19 | } | |

The geometry slice data syntax in Table 9 is modified by adding or changing syntax elements at rows 3-14. At row 14, new variables depthX, depthY, depthZ, and partitionSkip are added as input to the geometry_node function.

The variables NodeX[depthX][nodeIdx], NodeY[depthY][nodeIdx], and NodeZ[depthZ][nodeIdx] represent the x, y, and z coordinates of the nodeIdx-th node in decoding order at the given depth. The variable NumNodesAtDepth[depth] represents the number of nodes to be decoded at the given depth. The variables depthX, depthY, and depthZ specify the depth in x, y and z dimensions, respectively.

The variable partitionSkip specifies the partition type and direction by the table below (Table 10).

TABLE 10

| | Partition type and direction | | | |
|---|---|---|---|---|
| | QT along x-y axes | QT along x-z axes | QT along y-z axes | OT |
| partitionSkip | b001 | b010 | b100 | b000 |

| | Partition type and direction | | |
|---|---|---|---|
| | BT along x axis | BT along y axis | BT along z axis |
| partitionSkip | b011 | b101 | b110 |

The variable partitionSkip is represented in binary form with three bits $b_x b_y b_z$ which specify whether to skip partition along x, y and z dimension, respectively. For example, $b_x=1$ indicates no partition along x dimension (partition is skipped). The partition type and direction can be determined by certain conditions.

TABLE 11

| | | Descriptor |
|---|---|---|
| 0 * | geometry_node( depthX, depthY, depthZ, partitionSkip, nodeIdx, xN, yN, zN ) { | |
| 1 | if( NeighbourPattern = = 0 ) { | |
| 2 | single_occupancy_flag | ae(v) |
| 3 | if( single_occupancy_flag ) | |
| 4 * | occupancy_idx | ae(v) |
| 5 | } | |
| 6 | if( !single_occupancy_flag ) | |
| 7 | if( bitwise_occupancy_flag ) | |
| 8 * | occupancy_map | ae(v) |
| 9 | else | |
| 10 | occupancy_byte | ae(v) |
| 11 * | /* NB: splitting of the current node is described in semantics */ | |
| 12 * | if( depthX > = MaxNodeSizeLog2X − 1 && depthY > = MaxNodeSizeLog2Y − 1 && depthZ > = MaxNodeSizeLog2Z − 1) // [NB ie NodeSize = 2] | |
| 13 | if( !unique_geometry_points_flag ) | |
| 14 | for( child = 0; child < GeometryNodeChildrenCnt; child++ ) { | |
| 15 | num_points_eq1_flag [Ed(df): _gt1_flag?] | ae(v) |
| 16 | if( !num_points_eq1_flag ) | |
| 17 | num_points_minus2 | ae(v) |
| 18 | } | |
| 19 | } else { | |
| 20 | if( DirectModeFlagPresent ) | |
| 21 | direct_mode_flag | ae(v) |
| 22 | if( direct_mode_flag ) { | |

TABLE 11-continued

| | | Descriptor |
|---|---|---|
| 23 | num_direct_points_minus1 | ae(v) |
| 24 * | for( i = 0; i <= num_direct_points_minus1; i++ ) | |
| 25 * |   for( j = 0; j < ChildNodeSizeLog2X; j++ ) { | |
| 26 * |     point_rem_x[ i ][ j ] | ae(v) |
| 27 * |   } | |
| 28 * |   for( j = 0; j < ChildNodeSizeLog2Y; j++ ) { | |
| 29 * |     point_rem_y[ i ][ j ] | ae(v) |
| 30 * |   } | |
| 31 * |   for( j = 0; j < ChildNodeSizeLog2Z; j++ ) { | |
| 32 * |     point_rem_z[ i ][ j ] | ae(v) |
| 33 * |   } | |
| 34 |   } | |
| 35 | } | |
| 36 | } | |

The geometry node syntax in Table 11 is modified by adding or changing rows 0, 4, 8, 11-12, and 24-33. At row 0, new input variables depthX, depthY, depthZ, partitionSkip are introduced to facilitate QT and BT partitions. At row 12, the condition of verifying whether a minimum node size has been reached are modified to be based on evaluation of three dimensions because node sizes at different dimensions can be different when QT and BT partitions are applied.

The syntax structure at rows 24-33 describes syntax elements of 3D point coordinates within a child node processed with the DM. The variables ChildNodeSizeLog2X, ChildNodeSizeLog2Y and ChildNodeSizeLog2Z specify the child node size for each dimension, and can be determined by implicit QT and BT partitions as follows:

```
NodeSizeLog2X = MaxNodeSizeXLog2 − depthX,
NodeSizeLog2Y = MaxNodeSizeYLog2 − depthY;
NodeSizeLog2Z = MaxNodeSizeZLog2 − depthZ;
if( partitionSkip==b001 || partitionSkip==b010 || partitionSkip==b011 ||
partitionSkip==b000 )
   ChildNodeSizeLog2X = NodeSizeLog2X − 1;
else
   ChildNodeSizeLog2X = NodeSizeLog2X;
if( partitionSkip==b100 || partitionSkip==b001 || partitionSkip==b101 ||
partitionSkip==b000 )
   ChildNodeSizeLog2Y = NodeSizeLog2Y − 1;
else
   ChildNodeSizeLog2Y = NodeSizeLog2Y;
if( partitionSkip==b010 || partitionSkip==b100 || partitionSkip==b110 ||
partitionSkip==b000 )
   ChildNodeSizeLog2Z = NodeSizeLog2Z − 1;
else
   ChildNodeSizeLog2Z = NodeSizeLog2Z.
```

In the above process, if a partition takes place at a dimension, the child node log2 size at that dimension would be the node log2 size at that dimension minus 1.

At row 4, the syntax element occupancy_idx identifies index of the single occupied child of the current node in the geometry octree child node traversal order. When present, a variable OccupancyMap can be derived as follows:

OccupancyMap=1<<occupancy_idx.

A corresponding parsing process of occupancy_idx can be described as follows:

Input to this process is the variable partitionSkip of the current node.

Output from this process is the syntax element value of occupancy_idx, constructed as follows:

```
occupancy_idx = 0;
if( !(partitionSkip & 1) )
   occupancy_idx = readBinEq( );
if( !(partitionSkip & 2) )
   occupancy_idx |= readBinEq( ) << 1;
if( !(partitionSkip & 4) )
   occupancy_idx |= readBinEq( ) << 2;
```

In the above process, for QT or BT partition, only bit(s) related with the dimension(s) where a partition has taken place are signaled. Thus, fewer bits are signaled than OT partition to indicate the single child node position in the occupancy code. The compound bitwise OR operator |="set" (set to 1) particular bits in the variable occupancy_idx.

At row 8, the syntax element occupancy_map is a bitmap that identifies the occupied child nodes of the current node. When present, the variable OccupancyMap is set equal to the output of the geometry occupancy map permutation process when invoked with variables NeighbourPattern and occupancy_map as inputs. NeighbourPattern (neighbour pattern) is a neighbourhood occupancy pattern for context modeling. As described with reference to FIGS. 8-9, bins in an occupancy code can be skipped for signaling for a QT or BT partition. Four bins can be skipped for a QT partition, while 6 bins can be skipped for a BT partition. Accordingly, bits at those skipped-bit positions in an occupancy code can be inferred to be 0 at a decoder.

The corresponding geometry octree occupancy parsing process can be described as follows where some bits are inferred to be zero based on the variable partitionSkip that indicates a partition type and a partition direction using a variable binIsSkiped[binIdx].

This process reconstructs the syntax element occupancy_map.

Input to this process is the NeighbourPattern, binIsSkiped and binIsInferred of the current node.

Output from this process is the syntax element value, constructed as follows:

```
value = 0;
for (binIdx = 0; binIdx < 8; binIdx++) {
   if( binIsSkiped[binIdx] )
      bin = 0;
   else if( birdsInferred )
      bin = 1;
   else
      bin = readBin(binIdx)
   value = value | (bin << bitCodingOrder[ binIdx 1]);
}
``` where the variable binIsSkiped[binIdx] is set according to the following,

```
if( (partitionSkip&1) &&
   ( inverseMap[NeighbourPattern][bitCodingOrder[binIdx]]==1
   || ( inverseMap[NeighbourPattern][bitCodingOrder[binIdx]]==3
   || ( inverseMap[NeighbourPattern][bitCodingOrder[binIdx]]==5
   || ( inverseMap[NeighbourPattern][bitCodingOrder[binIdx]]==7 )
   binIsSkiped[binIdx]=1;
else if( (partitionSkip&2) &&
   ( inverseMap[NeighbourPattern][bitCodingOrder[binIdx]]==2
   || ( inverseMap[NeighbourPattern][bitCodingOrder[binIdx]]==3
   || ( inverseMap[NeighbourPattern][bitCodingOrder[binIdx]]==6
```

-continued

```
|| ( inverseMap[NeighbourPattern][bitCodingOrder[binIdx]]==7 )
    binIsSkiped[binIdx]=1;
else if( (partitionSkip&4) &&
    ( inverseMap[NeighbourPattern][bitCodingOrder[binIdx]]==4
    || ( inverseMap[NeighbourPattern][bitCodingOrder[binIdx]]==5
    || ( inverseMap[NeighbourPattern][bitCodingOrder[binIdx]]==6
    || ( inverseMap[NeighbourPattern][bitCodingOrder[binIdx]]==7 )
    binIsSkiped[binIdx]=1;
else
    binIsSkiped[binIdx]=0.
``` bitCodingOrder[i] is defined by the table below:

TABLE 12

| i | 0 | 1 | 2 | 3 | 4 | 5 | 6 | 7 |
|---|---|---|---|---|---|---|---|---|
| bitCodingOrder[i] | 1 | 7 | 5 | 3 | 2 | 4 | 6 | 0 | inverseMap[i][j] is defined by the tables below (Tables 13-14):

TABLE 13

| inverseMap[ i ][ j ] | | | | j | | | | |
|---|---|---|---|---|---|---|---|---|
| i | 0 | 1 | 2 | 3 | 4 | 5 | 6 | 7 |
| 0 | 0 | 1 | 2 | 3 | 4 | 5 | 6 | 7 |
| 1 | 0 | 1 | 2 | 3 | 4 | 5 | 6 | 7 |
| 2 | 6 | 7 | 4 | 5 | 2 | 3 | 0 | 1 |
| 3 | 0 | 1 | 2 | 3 | 4 | 5 | 6 | 7 |
| 4 | 2 | 3 | 6 | 7 | 0 | 1 | 4 | 5 |
| 5 | 2 | 3 | 6 | 7 | 0 | 1 | 4 | 5 |
| 6 | 6 | 7 | 4 | 5 | 2 | 3 | 0 | 1 |
| 7 | 4 | 5 | 0 | 1 | 6 | 7 | 2 | 3 |
| 8 | 4 | 5 | 0 | 1 | 6 | 7 | 2 | 3 |
| 9 | 0 | 1 | 2 | 3 | 4 | 5 | 6 | 7 |
| 10 | 4 | 5 | 0 | 1 | 6 | 7 | 2 | 3 |
| 11 | 2 | 3 | 6 | 7 | 0 | 1 | 4 | 5 |
| 12 | 4 | 5 | 0 | 1 | 6 | 7 | 2 | 3 |
| 13 | 6 | 7 | 4 | 5 | 2 | 3 | 0 | 1 |
| 14 | 0 | 1 | 2 | 3 | 4 | 5 | 6 | 7 |
| 15 | 0 | 1 | 2 | 3 | 4 | 5 | 6 | 7 |
| 16 | 5 | 1 | 7 | 3 | 4 | 0 | 6 | 2 |
| 17 | 3 | 1 | 2 | 0 | 7 | 5 | 6 | 4 |
| 18 | 5 | 7 | 4 | 6 | 1 | 3 | 0 | 2 |
| 19 | 2 | 0 | 6 | 4 | 3 | 1 | 7 | 5 |
| 20 | 7 | 3 | 6 | 2 | 5 | 1 | 4 | 0 |
| 21 | 3 | 2 | 7 | 6 | 1 | 0 | 5 | 4 |
| 22 | 7 | 6 | 5 | 4 | 3 | 2 | 1 | 0 |
| 23 | 5 | 4 | 1 | 0 | 7 | 6 | 3 | 2 |
| 24 | 1 | 5 | 0 | 4 | 3 | 7 | 2 | 6 |
| 25 | 1 | 0 | 3 | 2 | 5 | 4 | 7 | 6 |
| 26 | 5 | 4 | 1 | 0 | 7 | 6 | 3 | 2 |
| 27 | 3 | 2 | 7 | 6 | 1 | 0 | 5 | 4 |
| 28 | 0 | 4 | 2 | 6 | 1 | 5 | 3 | 7 |
| 29 | 7 | 6 | 5 | 4 | 3 | 2 | 1 | 0 |
| 30 | 1 | 0 | 3 | 2 | 5 | 4 | 7 | 6 |
| 31 | 1 | 0 | 3 | 2 | 5 | 4 | 7 | 6 |
| 32 | 4 | 0 | 6 | 2 | 5 | 1 | 7 | 3 |

TABLE 14

(Continue from Table 13)

| inverseMap[ i ][j] | | | | j | | | | |
|---|---|---|---|---|---|---|---|---|
| i | 0 | 1 | 2 | 3 | 4 | 5 | 6 | 7 |
| 33 | 2 | 0 | 3 | 1 | 6 | 4 | 7 | 5 |
| 34 | 4 | 6 | 5 | 7 | 0 | 2 | 1 | 3 |
| 35 | 3 | 1 | 7 | 5 | 2 | 0 | 6 | 4 |
| 36 | 6 | 2 | 7 | 3 | 4 | 0 | 5 | 1 |
| 37 | 2 | 3 | 6 | 7 | 0 | 1 | 4 | 5 |
| 38 | 6 | 7 | 4 | 5 | 2 | 3 | 0 | 1 |
| 39 | 4 | 5 | 0 | 1 | 6 | 7 | 2 | 3 |
| 40 | 0 | 4 | 1 | 5 | 2 | 6 | 3 | 7 |
| 41 | 0 | 1 | 2 | 3 | 4 | 5 | 6 | 7 |
| 42 | 4 | 5 | 0 | 1 | 6 | 7 | 2 | 3 |
| 43 | 2 | 3 | 6 | 7 | 0 | 1 | 4 | 5 |
| 44 | 1 | 5 | 3 | 7 | 0 | 4 | 2 | 6 |
| 45 | 6 | 7 | 4 | 5 | 2 | 3 | 0 | 1 |
| 46 | 0 | 1 | 2 | 3 | 4 | 5 | 6 | 7 |
| 47 | 0 | 1 | 2 | 3 | 4 | 5 | 6 | 7 |
| 48 | 4 | 0 | 6 | 2 | 5 | 1 | 7 | 3 |
| 49 | 7 | 5 | 6 | 4 | 3 | 1 | 2 | 0 |
| 50 | 1 | 3 | 0 | 2 | 5 | 7 | 4 | 6 |
| 51 | 2 | 0 | 3 | 1 | 6 | 4 | 7 | 5 |
| 52 | 5 | 1 | 4 | 0 | 7 | 3 | 6 | 2 |
| 53 | 0 | 4 | 1 | 5 | 2 | 6 | 3 | 7 |
| 54 | 2 | 0 | 3 | 1 | 6 | 4 | 7 | 5 |
| 55 | 6 | 4 | 2 | 0 | 7 | 5 | 3 | 1 |
| 56 | 3 | 7 | 2 | 6 | 1 | 5 | 0 | 4 |
| 57 | 4 | 6 | 5 | 7 | 0 | 2 | 1 | 3 |
| 58 | 6 | 2 | 7 | 3 | 4 | 0 | 5 | 1 |
| 59 | 0 | 2 | 4 | 6 | 1 | 3 | 5 | 7 |
| 60 | 0 | 4 | 1 | 5 | 2 | 6 | 3 | 7 |
| 61 | 2 | 6 | 0 | 4 | 3 | 7 | 1 | 5 |
| 62 | 4 | 0 | 6 | 2 | 5 | 1 | 7 | 3 |
| 63 | 0 | 1 | 2 | 3 | 4 | 5 | 6 | 7 |

Embodiment B

In another embodiment, only one dimension out of three allows to have different sizes. In this case, if this dimension has larger size than the other two, only implicit BT partitions along this dimension are performed. If this dimension has smaller size than the other two, only implicit QT partitions along the other two dimensions are performed. The signaling of implicit BT or implicit QT in this embodiment is similar as described in previous embodiment.

Embodiment C

Parameters can be defined for specifying certain conditions of implicit QT and BT partitions. These parameters can be either fixed for encoder and decoder (taking a locally preconfigured value, such as a default value), or they can be signaled at a header of the bitstream to enable sequence-level or slice-level optimizations. Embodiments C-G are described below to shown how parameters useful for defining conditions of implicit QT and BT partitions are signaled or configured.

In Embodiment C, parameters are signaled, which can be in either a sequence or slice header, as follows.

TABLE 15

| # | | Descriptor |
|---|---|---|
| | geometry_parameter_set( ) { | |
| 1 | gps_geom_parameter_set_id | ue(v) |
| 2 | gps_seq_parameter_set_id | ue(v) |
| 3 | gps_box_present_flag | u(1) |
| 4 | unique_geometry_points_flag | u(1) |
| 5 | neighbour_context_restriction_flag | u(1) |
| 6 | inferred_direct_coding_mode_enabled_flag | u(1) |
| 7 | bitwise_occupancy_coding_flag | u(1) |
| 8 | child_neighbours_enabled_flag | u(1) |
| 9 | geom_occupancy_ctx_reduction_factor | ue(v) |
| 10 | log2_neighbour_avail_boundary | ue(v) |

TABLE 15-continued

| # | | Descriptor |
|---|---|---|
| 11 | log2_intra_pred_max_node_size | ue(v) |
| 12 | log2_trisoup_node_size | ue(v) |
| 13 * | gps_max_num_implicit_qtbt_before_ot | ue(v) |
| 14 * | gps_min_size_implicit_qtbt | ue(v) |
| 15 * | gps_implicit_bt_before_implicit_qt_flag | u(1) |
| 16 | gps_extension_present_flag | u(1) |
| 17 | if( gps_extension_present_flag ) | |
| 18 |   while( more_data_in_byte_stream( ) ) | |
| 19 |     gps_extension_data_flag | u(1) |
| 20 |   byte_alignment( ) | |
| 21 | } | |

The geometry parameter set syntax in Table 15 is modified by adding syntax elements for signaling parameters for control QT and BT partitions at rows 13-15.

gps_max_num_implicit_qtbt_before_ot specifies a maximal number of implicit QT and BT partitions before OT partitions, which is denoted by K.

gps_min_size_implicit_qtbt specifies a minimal size of implicit QT and BT partitions, which is denoted by M. This parameter prevents implicit QT and BT partitions when all dimensions of a current node are smaller than or equal to M.

gps_implicit_bt_before_implicit_qt_flag specifies a priority of implicit QT and BT partitions, which is denoted by BTFirst. If BTFirst=1, implicit BT partitions are performed before implicit QT partitions. If BTFirst=0, implicit QT partitions are performed before implicit BT partitions.

Embodiment D

In another embodiment, partial parameters are signaled in either a sequence or slice header, while the rest are fixed. The following example fixes M and BTFirst, and signals K by gps_max_num_implicit_qtbt_before_ot.

TABLE 16

| # | | Descriptor |
|---|---|---|
| | geometry_parameter_set( ) { | |
| 1 | gps_geom_parameter_set_id | ue(v) |
| 2 | gps_seq_parameter_set_id | ue(v) |
| 3 | gps_box_present_flag | u(1) |
| 4 | unique_geometry_points_flag | u(1) |
| 5 | neighbour_context_restriction_flag | u(1) |
| 6 | inferred_direct_coding_mode_enabled_flag | u(1) |
| 7 | bitwise_occupancy_coding_flag | u(1) |
| 8 | child_neighbours_enabled_flag | u(1) |
| 9 | geom_occupancy_ctx_reduction_factor | ue(v) |
| 10 | log2_neighbour_avail_boundary | ue(v) |
| 11 | log2_intra_pred_max_node_size | ue(v) |
| 12 | log2_trisoup_node_size | ue(v) |
| 13 * | gps_max_num_implicit_qtbt_before_ot | ue(v) |
| 14 | gps_extension_present_flag | u(1) |
| 15 | if( gps_extension_present_flag ) | |
| 16 |   while( more_data_in_byte_stream( ) ) | |
| 17 |     gps_extension_data_flag | u(1) |
| 18 |   byte_alignment( ) | |
| 19 | } | |

The geometry parameter set syntax in Table 16 is modified by adding a syntax element for signaling a parameter for control QT and BT partitions at rows 13.

gps_max_num_implicit_qtbt_before_ot specifies the maximal number of implicit QT and BT partitions before OT partitions. In this case, other parameters are fixed and therefore not signaled in bitstream, for instance, M is always 0, and BTFirst is always 1.

Embodiment E

In another embodiment, K and BTFirst are fixed, and M is signaled by gps_min_size_implicit_qtbt, as follows.

TABLE 17

| # | | Descriptor |
|---|---|---|
| | geometry_parameter_set( ) { | |
| 1 | gps_geom_parameter_set_id | ue(v) |
| 2 | gps_seq_parameter_set_id | ue(v) |
| 3 | gps_box_present_flag | u(1) |
| 4 | unique_geometry_points_flag | u(1) |
| 5 | neighbour_context_restriction_flag | u(1) |
| 6 | inferred_direct_coding_mode_enabled_flag | u(1) |
| 7 | bitwise_occupancy_coding_flag | u(1) |
| 8 | child_neighbours_enabled_flag | u(1) |
| 9 | geom_occupancy_ctx_reduction_factor | ue(v) |
| 10 | log2_neighbour_avail_boundary | ue(v) |
| 11 | log2_intra_pred_max_node_size | ue(v) |
| 12 | log2_trisoup_node_size | ue(v) |
| 13 * | gps_min_size_implicit_qtbt | ue(v) |
| 14 | gps_extension_present_flag | u(1) |
| 15 | if( gps_extension_present_flag ) | |
| 16 |   while( more_data_in_byte_stream( ) ) | |
| 17 |     gps_extension_data_flag | u(1) |
| 18 |   byte_alignment( ) | |
| 19 | } | |

The geometry parameter set syntax in Table 17 is modified by adding a syntax element for signaling a parameter for control QT and BT partitions at rows 13.

gps_min_size_implicit_qtbt specifies a minimal size of implicit QT and BT partitions, which is M. This parameter prevents implicit QT and BT partitions when all dimensions are smaller than or equal to M. In this case, other parameters are fixed and therefore not signaled in bitstream, for instance, K is always 0, and BTFirst is always 1.

Embodiment F

In another embodiment, the signaling of parameters for implicit partition is dependent on other syntaxes. In the example below, the signaling of parameters for implicit partition depends on log2_trisoup_node_size as follows.

TABLE 18

| # | | Descriptor |
|---|---|---|
| | geometry_parameter_set( ) { | |
| 1 | gps_geom_parameter_set_id | ue(v) |
| 2 | gps_seq_parameter_set_id | ue(v) |
| 3 | gps_box_present_flag | u(1) |
| 4 | unique_geometry_points_flag | u(1) |
| 5 | neighbour_context_restriction_flag | u(1) |
| 6 | inferred_direct_coding_mode_enabled_flag | u(1) |
| 7 | bitwise_occupancy_coding_flag | u(1) |
| 8 | child_neighbours_enabled_flag | u(1) |
| 9 | geom_occupancy_ctx_reduction_factor | ue(v) |
| 10 | log2_neighbour_avail_boundary | ue(v) |
| 11 | log2_intra_pred_max_node_size | ue(v) |
| 12 | log2_trisoup_node_size | ue(v) |
| 13 * | if( log2_trisoup_node_size == 0 ) { | |
| 14 * |   gps_max_num_implicit_qtbt_before_ot | ue(v) |
| 15 * | } | |
| 16 | gps_extension_present_flag | u(1) |
| 17 | if( gps_extension_present_flag ) | |
| 18 |   while( more_data_in_byte_stream( ) ) | |
| 19 |     gps_extension_data_flag | u(1) |
| 20 |   byte_alignment( ) | |
| 21 | } | |

The geometry parameter set syntax in Table 18 is modified by adding a syntax structure for signaling a parameter for control QT and BT partitions at rows 13-15.

gps_max_num_implicit_qtbt_before_ot specifies a maximal number of implicit QT and BT partitions before OT partitions, which is K. In this case, gps_max_num_implicit_qtbt_before_ot is signaled only if log2_trisoup_node_size is zero. If log2_trisoup_node_size is non-zero, K will be set to its maximum value by default. Other parameters are fixed and therefore not signaled in bitstream, for instance, M is always 0, and BTFirst is always 1.

Embodiment G

In another embodiment, none of these parameters for implicit partition is signaled, and the parameters can be all fixed. For example, they are fixed to be K=3, M=0, and BTFirst=1.

5. Conditions for Implicit QT and BT Partitions

Embodiments of different conditions for implicit QT and BT partitions are described in the following sub-sections. By using different controlling parameters and setting different conditions, different geometry partition processes or schemes can be carried out.

5.1 Performing Implicit QT and BT Partitions after OT

In a first scheme, OT partitions are performed all the way until some dimensions cannot be further partitioned. Therefore, the condition to perform implicit QT and BT partitions in this scheme is when one or two dimensions reach the smallest partition unit (i.e., one voxel).

Specifically, the partition type and direction can be determined according to Table 19 or Table 20. The priority parameter BTFirst is either fixed or specified by gps_implicit_bt_before_implicit_qt_flag. If BTFirst=1, implicit BT partitions have higher priority and will be performed before implicit QT partitions, and Table 19 applies in this case. If BTFirst=0, implicit QT partitions have higher priority and will be performed before implicit BT partitions, and Table 20 applies in this case. If none of the conditions listed in tables are met, an OT partition is performed.

TABLE 19

Conditions to perform implicit partition when BTFirst = 1

| Partition type and direction | | |
| --- | --- | --- |
| QT along x-y axes | QT along x-z axes | QT along y-z axes |
| Condition $d_z = 0 < d_x = d_y$ | $d_y = 0 < d_x = d_z$ | $d_x = 0 < d_y = d_z$ |

| Partition type and direction | | |
| --- | --- | --- |
| BT along x axis | BT along y axis | BT along z axis |
| Condition $d_y = 0 < d_z \leq d_x$ $d_z = 0 \leq d_y < d_x$ | $d_x = 0 \leq d_z < d_y$ $d_z = 0 \leq d_x < d_y$ | $d_x = 0 \leq d_y < d_z$ $d_y = 0 \leq d_x < d_z$ |

TABLE 20

Conditions to perform implicit partition when BTFirst = 0

| Partition type and direction | | |
| --- | --- | --- |
| QT along x-y axes | QT along x-z axes | QT along y-z axes |
| Condition $d_z = 0 < d_x \leq d_y$ | $d_y = 0 < d_x \leq d_z$ | $d_x = 0 < d_y \leq d_z$ |

| Partition type and direction | | |
| --- | --- | --- |
| BT along x axis | BT along y axis | BT along z axis |
| Condition $d_y = d_z = 0 < d_x$ | $d_x = d_z = 0 < d_y$ | $d_x = d_y = 0 < d_z$ |

Let a bounding box B have the size of $(2^{d_x}, 2^{d_y}, 2^{d_z})$. Without loss of generality, one can assume that $0 < d_x \leq d_y \leq d_z$. Two embodiments are described below.

In one embodiment, BTFirst=1 is either fixed or specified by gps_implicit_bt_before_implicit_qt_flag, indicating that implicit BT partitions have higher priority and will be performed before implicit QT partitions, and Table 19 applies. In this embodiment, OT partitions can be performed at first $d_x$ partition depths. After OTs, the sub-nodes will have the shape of $2^{(0, d_y-d_x, d_z-d_x)}$. Implicit BT partitions will then be performed along z-axis at next $d_z-d_y$ depths. After implicit BT partitions, the shape of the sub-nodes would be $2^{(0, d_y-d_x, d_y-d_x)}$, and then implicit QT partitions are performed along y-z axes at last $d_y-d_x$ depths until reaching the leaf nodes.

In another embodiment, BTFirst=0 is either fixed or specified by gps_implicit_bt_before_implicit_qt_flag, indicating that implicit QT partitions have higher priority and will be performed before implicit BT partitions, and Table 20 applies. In this embodiment, OT partitions will be performed at first $d_x$ partition depths. After OTs, the sub-nodes will have the shape of $2^{(0, d_y-d_x, d_z-d_x)}$. Implicit QT partitions can then be performed along y-z axes at next $d_y-d_x$ depths. After implicit QT partitions, the shape of the sub-nodes would be $2^{(0, 0, d_z-d_y)}$, and then implicit BT partitions are performed along z-axis at last $d_z-d_y$ depths until reaching the leaf nodes.

5.2 Performing Implicit QT and BT Partitions Before OT

A second scheme is to perform implicit QT and BT partitions before any OT partition to make the sub-nodes having the cubic shape. Therefore, in this case, the condition is that one or two dimensions have smaller sizes than the largest dimension.

Specifically, the partition type and direction can be determined according to Table 21 or Table 22. The priority parameter BTFirst is either fixed or specified by gps_implicit_bt_before_implicit_qt_flag. If BTFirst=1, implicit BT partitions have higher priority and will be performed before implicit QT partitions, and Table 21 applies. If BTFirst=0, implicit QT partitions have higher priority and will be performed before implicit BT partitions, and Table 22 applies. If none of the conditions listed in tables are met, an OT partition is performed.

TABLE 21

Conditions to perform implicit partition when BTFirst = 1

| Partition type and direction | | |
|---|---|---|
| QT along x-y axes | QT along x-z axes | QT along y-z axes |
| Condition: $d_z < d_x = d_y$ | $d_y < d_x = d_z$ | $d_x < d_y = d_z$ |

| Partition type and direction | | |
|---|---|---|
| BT along x axis | BT along y axis | BT along z axis |
| Condition: $d_y < d_x$ and $d_z < d_x$ | $d_x < d_y$ and $d_z < d_y$ | $d_x < d_z$ and $d_y < d_z$ |

TABLE 22

Conditions to perform implicit partition when BTFirst = 0

| Partition type and direction | | |
|---|---|---|
| QT along x-y axes | QT along x-z axes | QT along y-z axes |
| Condition: $d_z < d_x$ and $d_z < d_y$ | $d_y < d_x$ and $d_y < d_z$ | $d_x < d_y$ and $d_x < d_z$ |

| Partition type and direction | | |
|---|---|---|
| BT along x axis | BT along y axis | BT along z axis |
| Condition: $d_y = d_z < d_x$ | $d_x = d_z < d_y$ | $d_x = d_y < d_z$ |

Let a bounding box B have the size of $(2^{d_x}, 2^{d_y}, 2^{d_z})$. Without loss of generality, one can assume that $0 < d_x \le d_y \le d_z$. Two embodiments are described below.

In one embodiment, BTFirst=1 is either fixed or specified by gps_implicit_bt_before_implicit_qt_flag, indicating that implicit BT partitions have higher priority and will be performed before implicit QT partitions, and Table 21 applies. In this embodiment, implicit BT partitions will be performed along z-axis at first $d_z - d_y$ depths, and then implicit QT partitions are performed along y-z axes at next $d_y - d_x$ depths. After implicit QT and BT partitions, the size of all sub-nodes would be $2^{(d_x, d_x, d_x)}$, the OT partitions are performed $d_x$ times to reach the leaf nodes.

In another embodiment, BTFirst=0 is either fixed or specified by gps_implicit_bt_before_implicit_qt_flag, indicating that implicit QT partitions have higher priority and will be performed before implicit BT partitions, and Table 22 applies. In this embodiment, implicit QT partitions will be performed along y-z axes at first $d_y - d_x$ depths, and then implicit BT partitions are performed along z-axis at next $d_z - d_y$ depths. After implicit QT and BT partitions, the size of all sub-nodes would be $2^{(d_x, d_x, d_x)}$ the OT partitions are performed $d_x$ times to reach the leaf nodes.

5.3 Hybrid Scheme of Implicit QT and BT Partitions

A third scheme is a combination of scheme of sections 111.5.1 and 111.5.3. In this case, a threshold K ($0 \le K \le \max(d_x, d_y, d_z) - \min(d_x, d_y, d_z)$) defines the maximum times of implicit QT and BT partitions that can be performed before OT partitions. This scheme is a generalization of the first two schemes, it degrades to scheme of section 111.5.1 when K=0, and it degrades to scheme of section 111.5.2 when K=max($d_x, d_y, d_z$)−min($d_x, d_y, d_z$).

Specifically, at the first K partition depths, decisions for partition type and direction follow the conditions defined in Table 21 or 22, after that follow Table 19 or 20. K is either fixed or specified by gps_max_num_implicit_qtbt_before_ot. The priority parameter BTFirst is either fixed or specified by gps_implicit_bt_before_implicit_qt_flag. If BTFirst=1, implicit BT partitions have higher priority and will be performed before implicit QT partitions, and Table 19 and Table 21 apply. If BTFirst=0, implicit QT partitions have higher priority and will be performed before implicit BT partitions, and Table 20 and Table 22 apply. If none of the conditions listed in tables are met, an OT partition is performed.

Let a bounding box B have the size of $(2^{d_x}, 2^{d_y}, 2^{d_z})$. Without loss of generality, one can assume that $0 < d_x \le d_y \le d_z$.

In one embodiment, K is either fixed or specified by gps_max_num_implicit_qtbt_before_ot, indicating that K times implicit BT and QT partitions will be performed first. BTFirst=1 is either fixed or specified by gps_implicit_bt_before_implicit_qt_flag, indicating that implicit BT partitions have higher priority and will be performed before implicit QT partitions, and Table 19 and Table 21 apply. In this embodiment, at first K ($K \le d_z - d_x$) depths, implicit BT partitions are performed along z-axis and implicit QT partitions are then performed along y-z axes according to Table 21. After that, the size of sub-nodes is $2^{(d_x, d_x+\delta_y, d_x\delta_z)}$, where the values of $\delta_3$, and $\delta_z$ ($\delta_z \ge \delta_y \ge 0$) are dependent on the value of K. Then, OT partitions are performed $d_x$ times making the remaining sub-nodes have the size of $2^{(0, \delta_y, \delta_z)}$. Last, according to Table 19, implicit BT partitions are performed along z-axis $\delta_z - \delta_y$ times, and implicit QT partitions are then performed along y-z axes $\delta_y$ times.

In another embodiment, K is either fixed or specified by gps_max_num_implicit_qtbt_before_ot, indicating that K times implicit BT and QT partitions will be performed first. BTFirst=0 is either fixed or specified by gps_implicit_bt_before_implicit_qt_flag, indicating that implicit QT partitions have higher priority and will be performed before implicit BT partitions, and Table 20 and Table 22 apply. In this embodiment, at first K ($K \le d_z - d_x$) depths, implicit QT partitions are performed along y-z axes and implicit BT partitions are then performed along z axis according to Table 22. After that, the size of sub-nodes is $2^{(d_x, d_x+\delta_y, d_x\delta_z)}$, where the values of $\delta_y$, and $\delta_z$ ($\delta_z \ge \delta_y \ge 0$) are dependent on the value of K. Then, OT partitions are performed $d_x$ times making the remaining sub-nodes have the size of $2^{(0, \delta_y, \delta_z)}$. Last, according to Table 20, implicit QT partitions are performed along y-z axes $\delta_y$ times, and implicit BT partitions are then performed along z-axis $\delta_z - \delta_y$ times.

5.4 Hybrid Scheme with a Minimum Size of Implicit QT and BT Partitions

The fourth scheme imposes extra constraint to previous schemes. In this case, a threshold K ($0 \le K \le \max(d_x, d_y, d_z) - \min(d_x, d_y, d_z)$) defines the maximum times of implicit QT and BT partitions that can be performed before OT partitions. Another parameter M ($0 \le M \le \min(d_x, d_y, d_z)$) defines the minimal size of implicit QT and BT partitions, and prevents implicit QT and BT partitions when all dimensions are smaller than or equal to M. The fourth scheme is a generalization of the first three schemes. The fourth degrades to the scheme of section III.5.1 when K=M=0, and degrades to the scheme of section III.5.2 when K=max($d_x, d_y, d_z$)−min($d_x, d_y, d_z$), M=0, and it degrades to the scheme of section III.5.3 when $0 < K < \max(d_x, d_y, d_z) - \min(d_x, d_y, d_z)$, M=0.

Specifically, at the first K partition levels, decisions for partition type and direction follow the conditions defined in Table 21 or 22, after that follow Table 23 or 24. Table 23 and 24 resemble Table 19 and 20 by replacing 0 with M. K is either fixed or specified by gps_max_num_implicit_qtbt_before_ot. M is either fixed or specified by gps_min_size_implicit_qtbt. The priority parameter BTFirst is either fixed or specified by gps_implicit_bt_before_implicit_qt_flag. If BTFirst=1, implicit BT partitions have higher priority and will be performed before implicit QT partitions, and Table 21 and Table 23 apply. If BTFirst=0, implicit QT partitions have higher priority and will be performed before implicit BT partitions, and Table 22 and Table 24 apply. If none of the conditions listed in tables are met, an OT partition is performed.

TABLE 23

Conditions to perform implicit QT or BT partition when BTFirst = 1

|  | QT along x-y axes | QT along x-z axes | QT along y-z axes |
|---|---|---|---|
| Condition | $d_z = M < d_x = d_y$ | $d_y = M < d_x = d_z$ | $d_x = M < d_y = d_z$ |
|  | BT along x axis | BT along y axis | BT along z axis |
| Condition | $d_y = M \le d_z < d_x$ $d_z = M \le d_y < d_x$ | $d_x = M \le d_z < d_y$ $d_z = M \le d_x < d_y$ | $d_x = M \le d_y < d_z$ $d_y = M \le d_x < d_z$ |

TABLE 24

Conditions to perform implicit QT or BT partition when BTFirst = 0

|  | QT along x-y axes | QT along x-z axes | QT along y-z axes |
|---|---|---|---|
| Condition | $d_z = M < d_x \le d_y$ | $d_y = M < d_x \le d_z$ | $d_x = M < d_y \le d_z$ |
|  | BT along x axis | BT along y axis | BT along z axis |
| Condition | $d_y = d_z = M < d_x$ | $d_x = d_z = M < d_y$ | $d_x = d_y = M < d_z$ |

Let the bounding box B have the size of $(2^{d_x}, 2^{d_y}, 2^{d_z})$. Without loss of generality, one can assume that $0 < d_x \le d_y \le d_z$.

In one embodiment, K is either fixed or specified by gps_max_num_implicit_qtbt_before_ot, indicating that K times implicit BT and QT partitions will be performed first. M is either fixed or specified by gps_min_size_implicit_qtbt, indicating that the minimal size of implicit QT and BT partitions. BTFirst=1 is either fixed or specified by gps_implicit_bt_before_implicit_qt_flag, indicating that implicit BT partitions have higher priority and will be performed before implicit QT partitions, and Table 21 and Table 22 apply. In this embodiment, at first K ($K \le d_z - d_x$) depths, implicit BT partitions are performed along z axis and implicit QT partitions are then performed along y-z axes based on Table 21. The size of sub-nodes then becomes $2^{(d_x, d_x+\delta_y, d_x+\delta_z)}$, where the value of $\delta_y$ and $\delta_z$ ($\delta_z \ge \delta_y \ge 0$) depend on the value of K. Then, OT partitions are performed $d_x-M$ times making the remaining sub-nodes have the size of $2^{(M, M+\delta_y, M+\delta_z)}$. Next, according to Tables 23, implicit BT partitions are performed along z-axis $\delta_z - \delta_y$ times, and implicit QT partitions are then performed along y-z axes $\delta_y$ times. The rest nodes are with the size of $2^{(M,M,M)}$, therefore OT partitions are performed M times to reach the smallest units.

In another embodiment, K is either fixed or specified by gps_max_num_implicit_qtbt_before_ot, indicating that K times implicit BT and QT partitions will be performed first. M is either fixed or specified by gps_min_size_implicit_qtbt, indicating the minimal size of implicit QT and BT partitions. BTFirst=0 is either fixed or specified by gps_implicit_bt_before_implicit_qt_flag, indicating implicit QT partitions have higher priority and will be performed before implicit BT partitions, and Table 22 and Table 24 apply. In this embodiment, at first K ($K \le d_z - d_x$) depths, implicit BT partitions are performed along z axis and implicit QT partitions are then performed along y-z axes based on Table 22. The size of sub-nodes then becomes $2^{(d_x, d_x+\delta_y, d_x+\delta_z)}$ where the value of $\delta_y$ and $\delta_z$ ($\delta_z \ge \delta_y \ge 0$) depend on the value of K. Then, OT partitions are performed $d_x$-M times making the remaining sub-nodes have the size of $2^{(M, M+\delta_y, M+\delta_z)}$. Next, according to Table 24, implicit QT partitions are performed along y-z axes $\delta_y$ times, and implicit BT partitions are then performed along z-axis $\delta_z - \delta_y$ times. The rest nodes are with the size of $2^{(M,M,M)}$, therefore OT partitions are performed M times to reach the smallest units.

Figure 10:
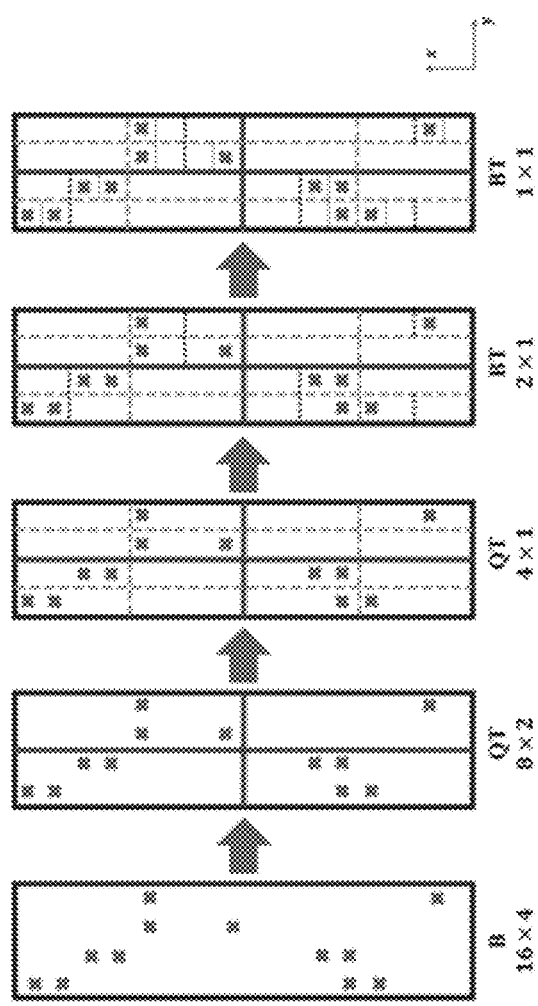
FIGS. 10-13 show two-dimensional (2D) blocks for demonstrating four different partition processes based on implicit QT and BT partitions.

5.5 2D Block Demonstration for Different Partition Schemes of QT and BT Partition The abovementioned four partition schemes can be demonstrated in 2D block as shown in FIGS. 10-13, respectively, where a 16×4 rectangular bounding box B is partitioned by 4-level iterative partitions to a smallest unit. In addition, a TMC13 scheme, where OT partitions are performed from an extended cubic bounding box, is illustrated in FIG. 10 for 2D cases. In 2D illustrations, a BT resembles a BT or QT in 3D, and a QT resembles an OT in 3D.

Example of Scheme of Section III.5.1

In FIG. 10, BT is performed after QT, which is equivalent to performing QT and BT after OT in 3D. As shown, B is first partitioned into four 4×1 sub-blocks by two-level QT partition and the remaining sub-block is then partitioned by two-level BT partition along x-axis. The partition order is implicitly QT, QT, BT, BT.

Example of Scheme of Section III.5.2

Figure 11:
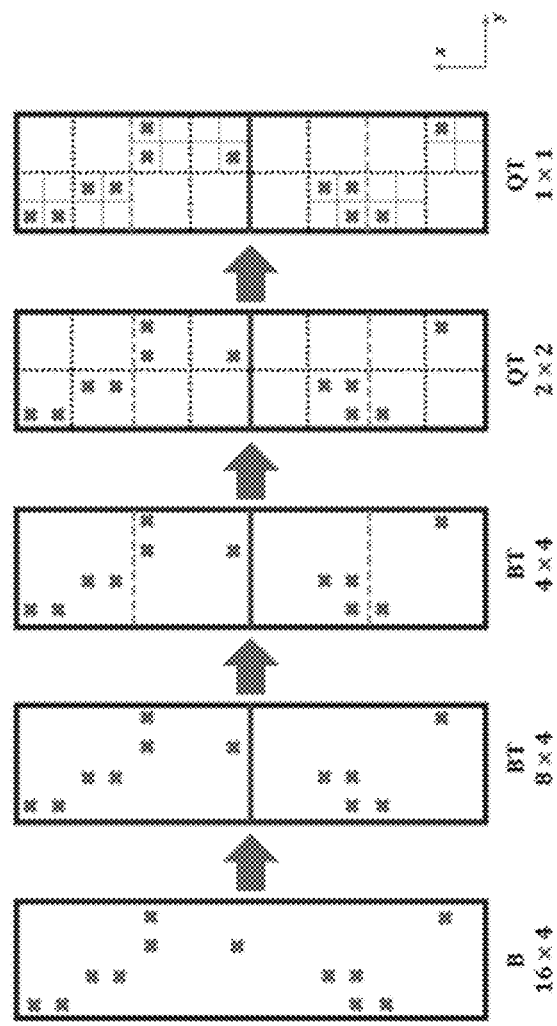

In FIG. 11, BT is performed before QT, which is equivalent to performing QT and BT before OT in 3D. As shown, B is first divided by two-level BT partitions along x-axis to form four 4×4 sub-blocks, and each sub-block is then divided by QT partitions. The partition order is implicitly BT, BT, QT, QT.

Example of Scheme of Section III.5.3

Figure 12:
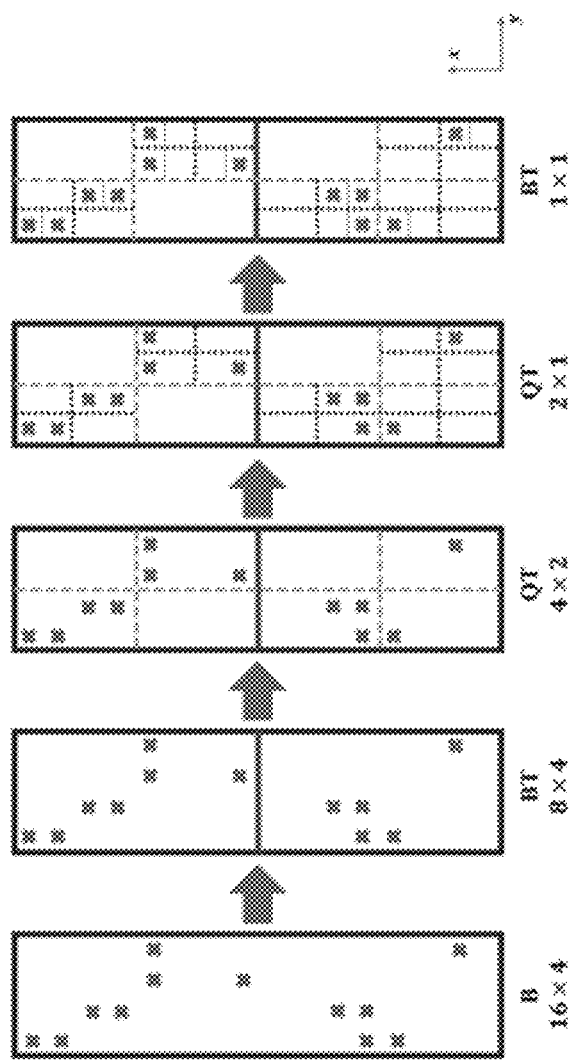

In FIG. 12, partition is done by the order of BT, QT, BT, which is equivalent to the hybrid scheme in 3D. The hybrid scheme with K=1 is shown in FIG. 12, where B is partitioned by BT partition once to get two 8×4 sub-blocks and each sub-block is then partitioned by two-level QT partitions to obtain multiple 2×1 smaller sub-blocks which are finally divided into smallest unit by another BT partition along x-axis. The partition order is implicitly BT, QT, QT, BT.

Example of Scheme of Section III.5.4

Figure 13:
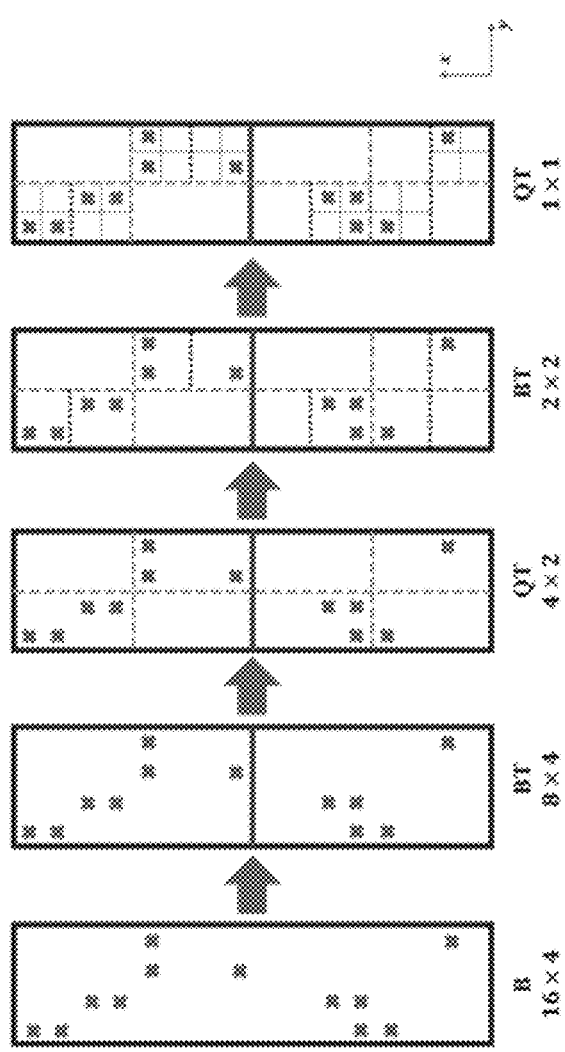

In FIG. 13, partition is done by the order of BT, QT, BT, QT, which is equivalent to the hybrid scheme with minimal size constraint in 3D. The hybrid scheme with minimal BT size constraint is shown in FIG. 13, where K=M=1. First, a BT partition is performed before QT partition because K=1, then QT partition performs until the shorter dimension reaches 2^M=2, i.e., 4×2 sub-blocks. Next, a BT partition is required because of the minimal BT size constraint, as a result the remaining sub-blocks are with the size of 2×2, and finally a QT partition is performed. The partition order is implicitly BT, QT, BT, QT.

Example of TMC13 Design

Figure 14:
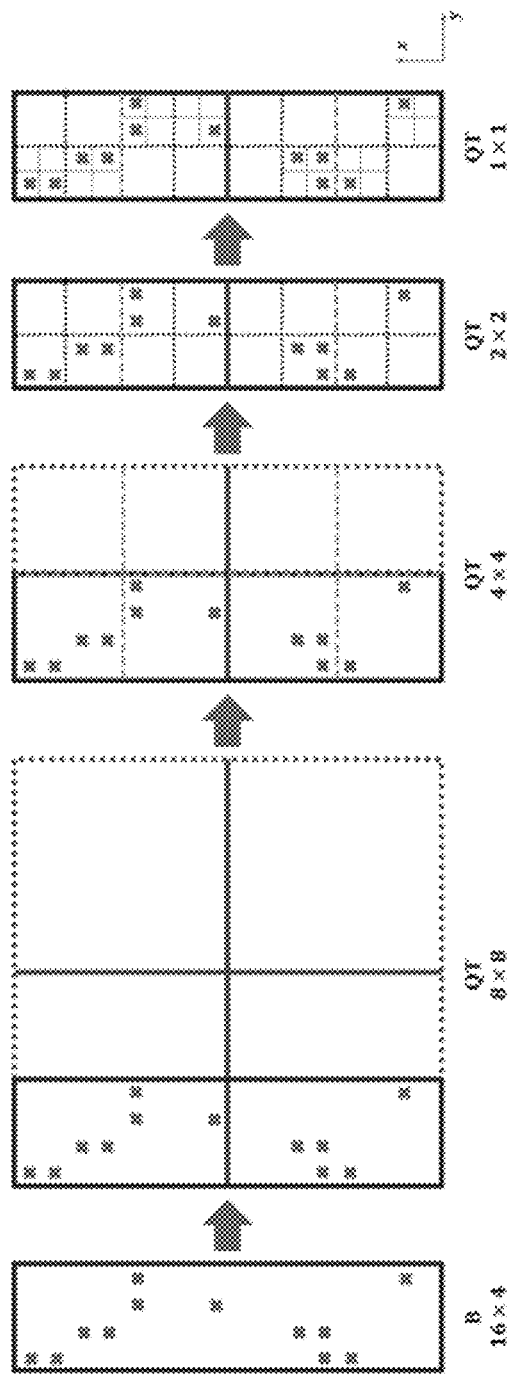
FIG. 14 shows 2D blocks for demonstrating a Testing Model 13 (TMC13) scheme where OT partitions are performed from an extended cubic bounding box.

FIG. 14 shows a QT scheme from an extended bounding box in 2D, which is equivalent to the OT partition scheme of a TMC13 design in 3D. As shown, recursive QT partitions start from an extended 16×16 rectangular bounding box, which is shown by dashed lines in the figure.

Assuming that the points are located on positions as marked by crosses in FIG. 10-14, one can calculate the bits required by each scheme. As summarized in the first column of Table 25, from which one can observe that the four schemes cost less bits than the TMC13 scheme. The schemes of section III.5.3 and III.5.4 perform the best. The second column in Table 25 calculates the required bits at the worst case where all the positions are occupied. From this simulation one can see least bits from scheme of section III.5.2, and schemes of sections III.5.2 and III.5.4 perform better than the TMC13 scheme. Thus, by suitably selecting controlling parameters (K and M) and conditions, favorable geometry coding results can be achieved.

TABLE 25

Comparison of required bits by different partition schemes

| | Required bits if occupancy is as shown in FIGs. 10-14 | Required bits at worst case of full occupancy |
|---|---|---|
| Scheme in section III.5.1 | 1 × 4 + 4 × 4 + 8 × 2 + 9 × 2 = 54 | 1 × 4 + 4 × 4 + 16 × 2 + 32 × 2 = 116 |
| Scheme in section III.5.2 | 1 × 2 + 2 × 2 + 4 × 4 + 7 × 4 = 50 | 1 × 2 + 2 × 2 + 4 × 4 + 16 × 4 = 86 |
| Scheme in section III.5.3 | 1 × 2 + 2 × 4 + 5 × 4 + 9 × 2 = 48 | 1 × 2 + 2 × 4 + 8 × 4 + 32 × 2 = 106 |
| Scheme in section III.5.4 | 1 × 2 + 2 × 4 + 5 × 2 + 7 × 4 = 48 | 1 × 2 + 2 × 4 + 8 × 2 + 16 × 4 = 90 |
| Scheme in TMC13 | 1 × 4 + 2 × 4 + 4 × 4 + 7 × 4 = 56 | 1 × 4 + 2 × 4 + 4 × 4 + 16 × 4 = 92 |

IV. Interaction with Planar Mode

1. Planar Mode

In some embodiments, planar modes in three directions x, y, and z are introduced for point cloud geometry coding. The planar modes can be activated at eligible node level through a planar mode activation flag coded in a bitstream. Also, an extra syntax is added to the bitstream to indicate a position of the plane associated with activated planar modes.

The predication of both the flag and the plane position are also introduced to ensure good compression of the new syntax element. Finally, local eligibility criteria can be used to avoid using planar modes in adverse regions of the point cloud and thus avoiding worse compression performance, particularly on dense point clouds.

2. Problems

Implicit QT/BT partition and planar modes are based on different observations and have similar coding gains on sparse point clouds. In general, implicit geometry partition is with low complexity and planar mode is more complex but more adaptive. Performance-wise, the two coding techniques achieve similar performance on sparse data, and planar mode can handle point clouds with many plane patterns better.

First of all, the two coding techniques share some similar concepts and coding schemes in occupancy coding. the two coding techniques both changed the occupancy coding scheme, where at certain conditions only partial of occupancy code is encoded while the rest part of occupancy code can be skipped and inferred at decoder side. For implicit geometry partition, the condition is determined implicitly by some predefined parameters. While for planar mode, the condition is determined by encoder and a flag and an index are explicit signaled to indicate which part of occupancy code is skipped.

Besides, the implicit geometry partition may start octree partition from a non-cubic bounding box and the shape of octree nodes may be asymmetric as well, while planar mode always assumes symmetric shapes of octree nodes.

These two techniques are not directly conflicting in concept. They have similarities/overlapping and differences as well. In various embodiments, the two techniques can be merged together.

In sections below, embodiments of combining the implicit geometry partition and the planar mode are described. In the following descriptions, some embodiments are shown to be changes to standard specifications of the draft for Geometry-based Point Cloud Compression, ISO/IEC 23090-9:2019(E), CD stage, ISO/IEC JTC 1/SC 29/WG 11 W18478, June 2019.

3. Implicit Geometry Partition Only or Planar Mode Only

In some embodiments, one of the two techniques is enabled when encoding geometry of a point cloud, i.e., either enabling implicit geometry partition (while disabling planar mode) or enabling planar mode (while disabling implicit geometry partition).

3.1 Signaling Controlling Flag in High Level Syntax for Implicit Geometry Partition To enable and disable implicit geometry partition, one flag can be signaled in high level syntax. The flag can be specified in sequence parameter set or slice header or geometry parameter set of the bitstream.

Embodiment A

In one embodiment, a flag of implicit geometry partition is specified in a geometry parameter set as follows.

TABLE 26

| # | | Descriptor |
|---|---|---|
| | geometry_parameter_set( ) { | |
| 1 | gps_geom_parameter_set_id | ue(v) |
| 2 | gps_seq_parameter_set_id | ue(v) |
| 3 | gps_box_present_flag | u(1) |
| 4 | if( gps_box_present_flag ){ | |
| 5 | gps_gsh_box_log2_scale_present_flag | u(1) |
| 6 | if( gps_gsh_box_log2_scale_present_ flag = = 0 ) | |
| 7 | gps_gsh_box_log2_scale | ue(v) |
| 8 | } | |
| 9 | unique_geometry_points_flag | u(1) |
| 10 | neighbour_context_restriction_flag | u(1) |
| 11 | inferred_direct_coding_mode_enabled_flag | u(1) |
| 12 | bitwise_occupancy_coding_flag | u(1) |
| 13 | adjacent_child_contextualization_ enabled_flag | u(1) |
| 14 | log2_neighbour_avail_boundary | ue(v) |
| 15 | log2_intra_pred_max_node_size | ue(v) |
| 16 | log2_trisoup_node_size | ue(v) |
| 17 * | gps_implicit_geom_partition_flag | u(1) |
| 18 | gps_extension_present_flag | u(1) |
| 19 | if( gps_extension_present_flag ) | |
| 20 | while( more_data_in_byte_stream( ) ) | |
| 21 | gps_extension_data_flag | u(1) |
| 22 | byte_alignment( ) | |
| 23 | } | |

The geometry parameter set syntax in Table 26 is modified by adding a syntax element at row 17.

gps_implicit_geom_partition_flag equal to 1 specifies that the implicit geometry partition is enabled for the sequence or slice. gps_implicit_geom_partition_flag equal to 0 specifies that the implicit geometry partition is disabled for the sequence or slice.

Embodiment B

In another embodiment, the flag is specified when a Trisoup scheme is disabled, in which case changes to a geometry parameter set are shown at rows 6-8 in Table 27.

TABLE 27

| # | | Descriptor |
|---|---|---|
| | geometry_parameter_set( ) { | |
| 1 | gps_geom_parameter_set_id | ue(v) |
| 2 | gps_seq_parameter_set_id | ue(v) |
| 3 | ... | ... |
| 4 | log2_intra_pred_max_node_size | ue(v) |
| 5 | log2_trisoup_node_size | ue(v) |
| 6 * | if ( log2_trisoup_node_size== 0 ) { | |
| 7 * | gps_implicit_geom_partition_flag | u(1) |
| 8 * | } | |
| 9 | ... | ... |
| 10 | byte_alignment( ) | |
| 11 | } | |

When log2_trisoup_node_size is greater than 0, gps_implicit_geom_partition_flag can be inferred as 0 without explicit signaling.

Embodiment C

In another embodiment, in addition to the flag, other parameters that related to implicit geometry partition may be specified in high level syntax when the flag gps_implicit_geom_partition_flag equals to 1. A geometry parameter set syntax in Table 28 is modified at rows 6-10.

TABLE 28

| # | | Descriptor |
|---|---|---|
| | geometry_parameter_set( ) { | |
| 1 | gps_geom_parameter_set_id | ue(v) |
| 2 | gps_seq_parameter_set_id | ue(v) |
| 3 | ... | ... |
| 4 | log2_intra_pred_max_node_size | ue(v) |
| 5 | log2_trisoup_node_size | ue(v) |
| 6 * | gps_implicit_geom_partition_flag | u(1) |
| 7 * | if (gps_implicit_geom_partition_flag ) { | |
| 8 * | gps_max_num_implicit_qtbt_before_ot | ue(v) |
| 9 * | gps_min_size_implicit_qtbt | ue(v) |
| 10 * | } | |
| 11 | ... | ... |
| 12 | byte_alignment( ) | |
| 13 | } | | gps_max_num_implicit_qtbt_before_ot specifies the maximal number of implicit QT and BT partitions before OT partitions. gps_min_size_implicit_qtbt specifies the minimal size of implicit QT and BT partitions.

Embodiment D

In another embodiment, the signaling of the bounding box of the geometry could be dependent on the value of gps_implicit_geom_partition_flag as follows. A geometry slice header syntax in Table 29 is changed by adding a syntax structure at rows 10-16.

TABLE 29

| # | | Descriptor |
|---|---|---|
| | geometry_slice_header( ) { | |
| 1 | gsh_geometry_parameter_set_id | ue(v) |
| 2 | gsh_tile_id | ue(v) |
| 3 | gsh_slice_id | ue(v) |
| 4 | if( gps_box_present_flag ) { | |
| 5 | gsh_box_log2_scale | ue(v) |
| 6 | gsh_box_origin_x | ue(v) |
| 7 | gsh_box_origin_y | ue(v) |
| 8 | gsh_box_origin_z | ue(v) |

TABLE 29-continued

| # | | Descriptor |
|---|---|---|
| 9 | } | |
| 10 * | if (gps_implicit_geom_partition_flag ) { | |
| 11 * | gsh_log2_max_nodesize_x | ue(v) |
| 12 * | gsh_log2_max_nodesize_y | ue(v) |
| 13 * | gsh_log2_max_nodesize_z | ue(v) |
| 14 * | } else { | |
| 15 * | gsh_log2_max_nodesize | ue(v) |
| 16 * | } | |
| 17 | gsh_num_points | ue(v) |
| 18 | byte_alignment( ) | |
| 19 | } | | gsh_log2_max_nodesize_x, gsh_log2_max_nodesize_y, and gsh_log2_max_nodesize_z specifies the bounding box size of x, y, z dimensions in log2 scale, respectively. They are specified only when gps_implicit_geom_partition_flag equals to 1. When gps_implicit_geom_partition_flag equals to 0, only one size is specified by gsh_log2_max_nodesize, and in this case, three dimensions are assumed to have the same size.

Embodiment E

In another embodiment, the bounding box sizes are specified by their differences. A geometry slice header syntax in Table 30 is modified at rows 10-16.

TABLE 30

| # | | Descriptor |
|---|---|---|
| | geometry_slice_header( ) { | |
| 1 | gsh_geometry_parameter_set_id | ue(v) |
| 2 | gsh_tile_id | ue(v) |
| 3 | gsh_slice_id | ue(v) |
| 4 | if( gps_box_present_flag ) { | |
| 5 | gsh_box_log2_scale | ue(v) |
| 6 | gsh_box_origin_x | ue(v) |
| 7 | gsh_box_origin_y | ue(v) |
| 8 | gsh_box_origin_z | ue(v) |
| 9 | } | |
| 10 * | if (gps_implicit_geom_partition_flag ) { | |
| 11 * | gsh_log2_max_nodesize_x | ue(v) |
| 12 * | gsh_log2_max_nodesize_y_minus_x | se(v) |
| 13 * | gsh_log2_max_nodesize_z_minus_y | se(v) |
| 14 * | } else { | |
| 15 * | gsh_log2_max_nodesize | ue(v) |
| 16 * | } | |
| 17 | gsh_num_points | ue(v) |
| 18 | byte_alignment( ) | |
| 19 | } | |

3.2 Signaling Controlling Flags in High Level Syntax Considering the Combination Scheme In this subsection, several embodiments are described as examples to show how to signal controlling flags in high level syntax when considering the combination of the implicit geometry partition and the planar mode.

Embodiment A

In one embodiment, two controlling flags are specified independently in a geometry parameter set as follows. A geometry parameter set syntax in Table 31 is modified at rows 6-7.

TABLE 31

| # | | Descriptor |
|---|---|---|
| | geometry_parameter_set( ) { | |
| 1 | gps_geom_parameter_set_id | ue(v) |
| 2 | gps_seq_parameter_set_id | ue(v) |
| 3 | ... | ... |
| 4 | log2_intra_pred_max_node_size | ue(v) |
| 5 | log2_trisoup_node_size | ue(v) |
| 6 * | gps_implicit_geom_partition_flag | u(1) |
| 7 * | gps_planar_mode_flag | u(1) |
| 8 | ... | ... |
| 9 | byte_alignment( ) | |
| 10 | } | | gps_planar_mode_flag equal to 1 specifies that the planar mode is enabled for the sequence or slice. gps_planar_mode_flag equal to 0 specifies that the planar mode is disabled for the sequence or slice.

However, in this combination scheme, it is assumed that only one of these two methods is enabled. For example, gps_implicit_geom_partition_flag and gps_planar_mode_flag cannot both equal to 1.

Embodiment B

In another embodiment, the controlling flag gps_planar_mode_flag is specified depending on the value of gps_implicit_geom_partition_flag in a geometry parameter set as follows. A geometry parameter set syntax in Table 32 is modified at rows 6-8.

TABLE 32

| # | | Descriptor |
|---|---|---|
| | geometry_parameter_set( ) { | |
| 1 | gps_geom_parameter_set_id | ue(v) |
| 2 | gps_seq_parameter_set_id | ue(v) |
| 3 | ... | ... |
| 4 | log2_intra_pred_max_node_size | ue(v) |
| 5 | log2_trisoup_node_size | ue(v) |
| 6 * | gps_implidt_geom_partition_flag | u(1) |
| 7 * | if ( gps_implicit_geom_partition_flag == 0 ) | |
| 8 * | gps_planar_mode_flag | u(1) |
| 9 | ... | ... |
| 10 | byte_alignment( ) | |
| 11 | } | |

In this case, gps_planar_mode_flag is specified only when gps_implicit_geom_partition_flag equals to 0. When gps_implicit_geom_partition_flag equals to 1, gps_planar_mode_flag can be inferred as 0.

Embodiment C

In another embodiment, the controlling flag gps_implicit_geom_partition_flag is specified depending on the value of gps_planar_mode_flag in a geometry parameter set as follows. A geometry parameter set syntax in Table 33 is modified at rows 6-8.

TABLE 33

| # | | Descriptor |
|---|---|---|
| | geometry_parameter_set( ) { | |
| 1 | gps_geom_parameter_set_id | ue(v) |
| 2 | gps_seq_parameter_set_id | ue(v) |
| 3 | ... | ... |
| 4 | log2_intra_pred_max_node_size | ue(v) |

TABLE 33-continued

| # | | Descriptor |
|---|---|---|
| 5 | log2_trisoup_node_size | ue(v) |
| 6 * | gps_planar_mode_flag | u(1) |
| 7 * | if (gps_planar_mode_flag == 0 ) | |
| 8 * | gps_implicit_geom_partition_flag | u(1) |
| 9 | ... | ... |
| 10 | byte_alignment( ) | |
| 11 | } | |

In this case, gps_implicit_geom_partition_flag is specified only when gps_planar_mode_flag equals to 0. When gps_planar_mode_flag equals to 1, gps_implicit_geom_partition_flag can be inferred as 0.

Embodiment D

In another embodiment, the controlling flag gps_implicit_geom_partition_flag is specified depending on the value of gps_planar_mode_flag and the value of log2_trisoup_node_size in a geometry parameter set as follows. A geometry parameter set syntax in Table 34 is modified at rows 6-8.

TABLE 34

| # | | Descriptor |
|---|---|---|
| | geometry_parameter_set( ) { | |
| 1 | gps_geom_parameter_set_id | ue(v) |
| 2 | gps_seq_parameter_set_id | ue(v) |
| 3 | ... | ... |
| 4 | log2_intra_pred_max_node_size | ue(v) |
| 5 | log2_trisoup_node_size | ue(v) |
| 6 * | gps_planar_mode_flag | u(1) |
| 7 * | if (gps_planar_mode_flag == 0 && log2_trisoup_node_size == 0) | |
| 8 * | gps_implicit_geom_partition_flag | u(1) |
| 9 | ... | ... |
| 10 | byte_alignment( ) | |
| 11 | } | |

In this case, gps_implicit_geom_partition_flag is specified only when both gps_planar_mode_flag and log2_trisoup_node_size equal to 0. Otherwise, gps_implicit_geom_partition_flag can be inferred as 0. In other words, implicit geometry partition can be enabled only when both Trisoup and planar mode are disabled.

4. Planar Mode is Eligible Only When Current Octree Node is a Cube

A second combination scheme can enable implicit geometry partition and planar mode at the same time. But some constraints are involved for planar mode. If implicit geometry partition is enabled, the bounding box and octree nodes may not be a cube. In this scheme, the constraint for applying planar mode is that the planar mode is eligible only when the current octree node is a cube, indicating $d_x=d_y=d_z$.

In one embodiment, a geometry coding syntax is shown in Table 35, which can be similar to that in Table 9.

TABLE 35

| # | | Descriptor |
|---|---|---|
| | geometry_slice_data( ) { | |
| 12 |   for( depth = 0; depth < MaxGeometryOctreeDepth; depth++ ) { | |
| 13 |     for( nodeIdx = 0; nodeIdx < NumNodesAtDepth[ depth ]; nodeIdx++ | |
| |     ) { | |
| 14 * |       /* NB: implicit partition is described in semantics */ | |
| 15 * |       partitionSkip =$b_x b_y b_z$ // depend on implicit partition conditions | |
| 16 * |       If ( !(partitionSkip & 4) ) | |
| 17 * |         depthX = depthX + 1; | |
| 18 * |       If ( !(partitionSkip & 2) ) | |
| 19 * |         depthY = depthY + 1; | |
| 20 * |       If ( !(partitionSkip & 1) ) | |
| 21 * |         depthZ = depthZ + 1; | |
| 22 * |       xN = NodeX[ depthX ][ nodeIdx ] | |
| 23 * |       yN = NodeY[ depthY ][ nodeIdx ] | |
| 24 * |       zN = NodeZ[ depthZ ][ nodeIdx ] | |
| 25 * |       geometry_node( depthX, depthY, depthZ, partitionSkip, nodeIdx, xN, yN, zN ) | |
| 26 |     } | |
| 27 |   } | |
| 28 |   if ( log2_trisoup_node_size > 0 ) | |
| 29 |     geometry_trisoup_data( ) | |
| 30 | } | |

The variables ChildNodeSizeXLog2, ChildNodeSizeYLog2 and ChildNodeSizeZLog2 specify the child node size for each dimension, and can be determined by implicit QT and BT partitions as follows,

```
NodeSizeXLog2 = MaxNodeSizeXLog2 – depthX;
NodeSizeYLog2 = MaxNodeSizeYLog2 – depthY;
NodeSizeZLog2 = MaxNodeSizeZLog2 – depthZ;
if( !(partitionSkip & 4) )
    ChildNodeSizeXLog2 = NodeSizeXLog2 – 1;
else
    ChildNodeSizeXLog2 = NodeSizeXLog2;
if( !(partitionSkip & 2) )
    ChildNodeSizeYLog2 = NodeSizeYLog2 – 1;
else
    ChildNodeSizeYLog2 = NodeSizeYLog2;
if( !(partitionSkip & 1) )
    ChildNodeSizeZLog2 = NodeSizeZLog2 – 1;
else
    ChildNodeSizeZLog2 = NodeSizeZLog2.
```

In this embodiment, the planar mode is ineligible when NodeSizeLog2X, NodeSizeLog2Y and NodeSizeLog2Z are not equal as follows,

```
if ((NodeSizeXLog2 != NodeSizeYLog2) || (NodeSizeXLog2 !=
NodeSizeZLog2) || (NodeSizeYLog2!= NodeSizeZLog2)) {
    planarModeEligibilityX = 0;
    planarModeEligibilityY = 0;
    planarModeEligibilityZ = 0;
}
``` where planarModeEligibilityX, planarModeEligibilityY and planarModeEligibilityZ specify whether the planar mode is eligible for X, Y, Z dimensions, respectively, in current coded node.

5. Planar Mode is Ineligible at Certain Dimensions that are not Partitioned

A third combination scheme further relaxes the constraint of planar mode, where the planar mode is eligible even when current octree node is not a cube. If one or two dimensions are not partitioned at one depth, the planar mode is ineligible at those dimensions while it is eligible at the rest of the dimensions. For example, if implicit geometry partition decides to perform partition along x and y dimensions but not z at a certain partition depth, then the planar mode is only eligible for x and y dimensions.

In this embodiment, the planar mode is ineligible at certain dimensions where partition is skipped by implicit geometry partition method as follows,

```
if( partitionSkip & 4 )
    planarModeEligibilityX = 0;
if( partitionSkip & 2 )
    planarModeEligibilityY = 0;
if( partitionSkip & 1 )
    planarModeEligibilityZ = 0.
```

It is noted that in other examples the planar mode may be changed in other aspects and in more complex way to align with the fact that the octree node can now be a rectangular cuboid.

V. Additional Embodiments of Implicit Geometry Partition

Embodiment A

Embodiment A provide an improvement on implicit geometry partition, and saves more bits when coding the occupancy code with implicit geometry partition. Specifically, the geometry octree occupancy parsing process described in Section III can be modified by introducing a process for determining the variable binIsInferred at the end of the geometry octree occupancy parsing process:

This process reconstructs the syntax element occupancy_map.

Input to this process is the NeighbourPattern, binIsSkiped and binIsInferred of the current node.

Output from this process is the syntax element value, constructed as follows:

```
value = 0;
for (binIdx = 0; binIdx < 8; binIdx++) {
    if( binIsSkiped[binIdx] )
```

-continued

```
        bin = 0;
    else if( binIsInferred )
        bin = 1;
    else
        bin = readBin(binIdx)
    value = value | (bin << bitCodingOrder[ binIdx ]);
}
where the variable binIsSkiped[binIdx] is set according to the following
    if( (partitionSkip & 1) &&
    ( inverseMap[NeighbourPattern][bitCodingOrder[binIdx]]
        & 1 ) )
        binIsSkiped[binIdx]=1;
    else if( (partitionSkip & 2) && (
        inverseMap[NeighbourPattern][bitCodingOrder[binIdx]] & 2 ) )
        binIsSkiped[binIdx]=1;
    else if (partitionSkip & 4) && (
        inverseMap[NeighbourPattern][bitCodingOrder[binIdx]] & 4 ) )
        binIsSkiped[binIdx]=1;
    else
        binIsSkiped[binIdx]=0;
``` and where, for each bin, the variable binIsInferred is set according to the following:

If either of the following conditions are true, binIsInferred is set equal to 1:

NeighbourPattern is equal to 0 and the number of previously decoded 1-valued bins is less than or equal to (binIdx+minOccupied−maxOccupied).

NeighbourPattern is not equal to 0, binIdx is equal to maxOccupied-1 and values of all previous decoded bins are zero.

where minOccupied=2, and maxOccupied=8 (if OT is applied), maxOccupied=4 (if QT is applied), maxOccupied=2 (if BT is applied).

Otherwise, if neither of the above conditions are true, binIsInferred is set equal to 0.

Embodiment B

In one embodiment, a controlling flag gps_implicit_geom_partition_flag and two parameters K and M are specified at a geometry parameter set as follows,

TABLE 36

|  | Descriptor |
| --- | --- |
| geometry_parameter_set( ) { |  |
| gps_geom_parameter_set_id | ue(v) |
| gps_seq_parameter_set_id | ue(v) |
| gps_box_present_flag | u(1) |
| if( gps_box_present_flag ){ |  |
| gps_gsh_box_log2_scale_present_flag | u(1) |
| if( gps_gsh_box_log2_scale_present_flag == 0 ) |  |
| gps_gsh_box_log2_scale | ue(v) |
| } |  |
| unique_geometry_points_flag | u(1) |
| neighbour_context_restriction_flag | u(1) |
| inferred_direct_coding_mode_enabled_flag | u(1) |
| bitwise_occupancy_coding_flag | u(1) |
| adjacent_child_contextualization_enabled_flag | u(1) |
| log2_neighbour_avail_boundary | ue(v) |
| log2_intra_pred_max_node_size | ue(v) |
| log2_trisoup_node_size | ue(v) |
| gps_implicit_geom_partition_flag | u(1) |
| if ( gps_implicit_geom_partition_flag ) { |  |

TABLE 36-continued

|  | Descriptor |
| --- | --- |
| gps_max_num_implicit_qtbt_before_ot | ue (v) |
| gps_min_size_implicit_qtbt | ue(v) |
| } |  |
| gps_extension_present_flag | u(1) |
| if( gps_extension_present_flag ) |  |
| while( more_datain_byte_stream( ) ) |  |
| gps_extension_data_flag | u(1) |
| byte_abgnment( ) |  |
| } |  | gps_implicit_geom_partition_flag equal to 1 specifies that the implicit geometry partition is enabled for the sequence or slice. gps_implicit_geom_partition_flag equal to 0 specifies that the implicit geometry partition is disabled for the sequence or slice. If gps_implicit_geom_partition_flag equals to 1, the following two parameters are signaled:

(1) gps_max_num_implicit_qtbt_before_ot specifies the maximal number of implicit QT and BT partitions before OT partitions, i.e., K=gps_max_num_implicit_qtbt_before_ot.

(2) gps_min_size_implicit_qtbt specifies the minimal size of implicit QT and BT partitions, i.e., M=gps_min_size_implicit_qtbt. This parameter M prevents implicit QT and BT partitions when all dimensions are smaller than or equal to M.

Embodiment C

In one embodiment, if the implicit QTBT is enabled, the size of bounding box is specified by three values in geometry slice header as follows,

|  | Descriptor |
| --- | --- |
| geometry_slice_header( ) { |  |
| gsh_geometry_parameter_set_id | ue(v) |
| gsh_tile_id | ue(v) |
| gsh_slice_id | ue(v) |
| if( gps_box_present_flag ) { |  |
| gsh_box_log2_scale | ue(v) |
| gsh_box_origin_x | ue(v) |
| gsh_box_origin_y | ue(v) |
| gsh_box_origin_z | ue(v) |
| } |  |
| if ( gps_implicit_geom_partition_flag ) { |  |
| gsh_log2_max_nodesize_x | ue(v) |
| gsh_log2_max_nodesize_y_minus_x | se (v) |
| gsh_log2_max_nodesize_z_minus_y | se (v) |
| } else { |  |
| gsh_log2_max_nodesize | ue(v) |
| } |  |
| gsh_num_points | ue(v) |
| byte_alignment( ) |  |
| } |  | gsh_log2_max_nodesize_x specifies the bounding box size in x dimension, i.e., MaxNodesizeXLog2 that is used in the decoding process as follows:

MaxNodeSizeXLog2=gsh_log2_max_nodesize_x.

MaxNodeSizeX=1<<MaxNodeSizeXLog2.

gsh_log2_max_nodesize_y_minus_x specifies the bounding box size in y dimension, i.e., MaxNodesizeYLog2 that is used in the decoding process as follows:

MaxNodeSizeYLog2=gsh_log2_max_nodesize_y_minus_x+MaxNodeSizeXLog2.

MaxNodeSizeY=1<<MaxNodeSizeYLog2.

gsh_log2_max_nodesize_z_minus_y specifies the bounding box size in z dimension, i.e., MaxNodesizeZLog2 that is used in the decoding process as follows:
MaxNodeSizeZLog2=gsh_log2_max_nodesize_z_minus_y+ MaxNodeSizeYLog2.
MaxNodeSizeZ=1<<MaxNodeSizeZLog2.
The parameters K and M are then updated as follows,

```
gsh_log2_max_nodesize = max{ MaxNodeSizeXLog2, MaxNodeSizeYLog2, MaxNodeSizeZLog2}
gsh_log2_min_nodesize = min{ MaxNodeSizeXLog2, MaxNodeSizeYLog2, MaxNodeSizeZLog2}
if (K > (gsh_log2_max_nodesize – gsh_log2_min_nodesize))
    K = gsh_log2_max_nodesize – gsh_log2_min_nodesize;
if (M > gsh_log2_min_nodesize)
    M = gsh_log2_min_nodesize;
if (gsh_log2_max_nodesize == gsh_log2_min_nodesize)
    M = 0;
if (log2_trisoup_node_size != 0) {
    K = gsh_log2_max_nodesize – gsh_log2_min_nodesize;
    M = 0;
}
```

In an embodiment, when a trisoup mode is enabled (log2_trisoup_node_size !=0 is true), M is changed to the minimum root node log2 dimension of the slice. It is noted that trisoup node log2 dimension needs to be no greater than the minimum root node log2 dimension of the slice.

Embodiment D

In an embodiment, a geometry slice data syntax in Table 37 is used in place of the syntax structure in Table 35 or Table 9. An implicit QT/BT decision function is newly introduced at row 3 of the Table 37. The Syntax of the implicit QT/BT decision function is shown in Table 38 where the variable partitionSkip is determined at rows 9-16, and depths in x, y, and z directions are updated at rows 17-23.

TABLE 37

| # | | Descriptor |
|---|---|---|
| | geometry_slice_data( ) { | |
| 1 * | depthX = 0; depthY = 0; depthZ = 0; | |
| 2 | for( depth = 0; depth < MaxGeometryOctreeDepth; depth++ ) { | |
| 3 * | partitionSkip = implicit_qtbt_decision(K, M, depth, depthX, depthY, depthZ) | |
| 4 | for( nodeIdx = 0; nodeIdx < NumNodesAtDepth[ depth ]; nodeIdx++ ) { | |
| 5 | xN = NodeX[ depthX ][ nodeIdx ] | |
| 6 | yN = NodeY[ depthY ][ nodeIdx ] | |
| 7 | zN = NodeZ[ depthZ ][ nodeIdx ] | |
| 8 | geometry_node( depthX, depthY, depthZ, partitionSkip, nodeIdx, xN, yN, zN ) | |
| 9 | } | |
| 10 | } | |
| 11 | if ( log2_trisoup_node_size > 0 ) | |
| 12 | geometry_trisoup_data( ) | |
| 13 | } | |

TABLE 38

| # | | Descriptor |
|---|---|---|
| | implicit_qtbt_decision ( K, M, depth, depthX, depthY, depthZ ) { | |
| 1 | partitionSkip = 0; | |
| 2 | NodeSizeXLog2 = MaxNodeSizeXLog2 - depthX; | |
| 3 | NodeSizeYLog2 = MaxNodeSizeYLog2 – depthY; | |
| 4 | NodeSizeZLog2 = MaxNodeSizeZLog2 - depthZ; | |

TABLE 38-continued

| # | Descriptor |
|---|---|
| 5 | MinNodeSizeLog2 = min( NodeSizeXLog2, NodeSizeYLog2, NodeSizeZLog2}; |
| 6 | MaxNodeSizeLog2 = max{ NodeSizeXLog2, NodeSizeYLog2, NodeSizeZLog2}; |
| 7 | If (MinNodeSizeLog2 == MaxNodeSizeLog2) |
| 8 | M = 0; |
| 9 * | if (K > depth ‖ M == MinNodeSizeLog2) { |
| 10 * | if (NodeSizeXLog2 < MaxNodeSizeLog2) |
| 11 * | partitionSkip \|= 4; |
| 12 * | if (NodeSizeYLog2 < MaxNodeSizeLog2) |
| 13 * | partitionSkip \|= 2; |
| 14 * | if (NodeSizeZLog2 < MaxNodeSizeLog2) |
| 15 * | partitionSkip \|= 1; |
| 16 * | } |
| 17 * | if ( !(partitionSkip & 4) ) |
| 18 * | depthX = depthX + 1; |
| 19 * | if ( !(partitionSkip & 2) ) |
| 20 * | depthY = depthY + 1; |
| 21 * | if( !(partitionSkip & 1) ) |
| 22 * | depthZ = depthZ + 1; |
| 23 * | } |

VI. Geometry Decoding Process Examples

Figure 15:
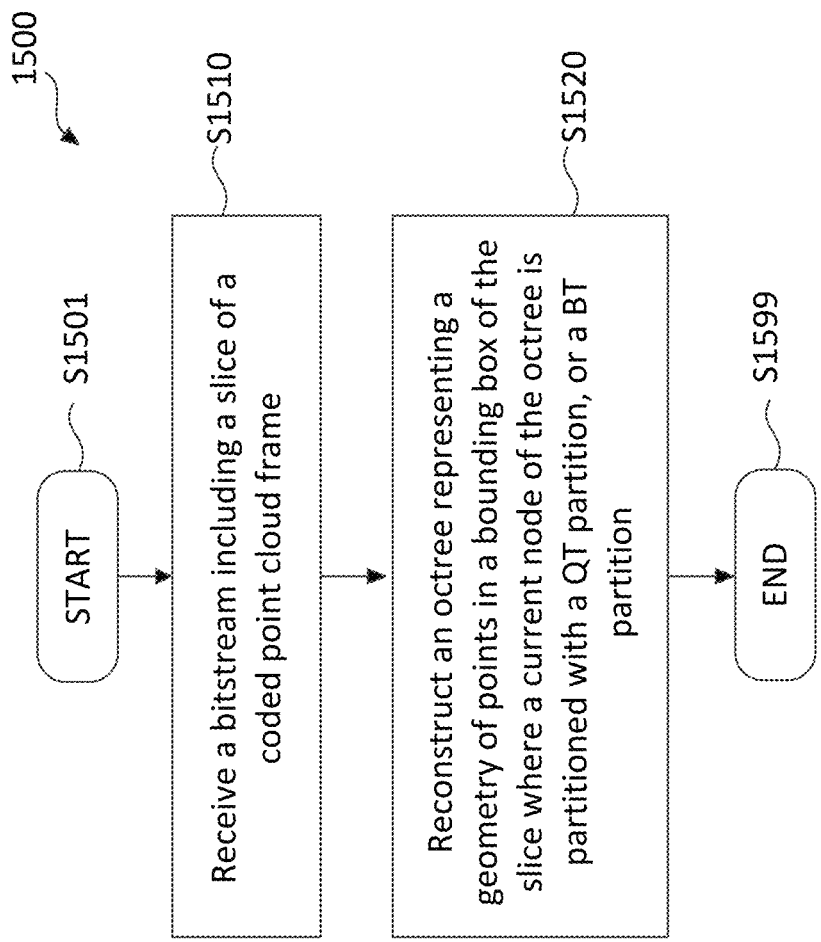
FIG. 15 shows a flow chart of a QT/BT-partition-based geometry decoding process for point cloud decoding in accordance with an embodiment of the disclosure.

FIG. 15 shows a flow chart outlining a process (1500) according to an embodiment of the disclosure. For example, the process (1500) can be used for point cloud decoding. The process (1500) can be used to generate an octree structure for representing a geometry of points in a bounding box of a slice at a point cloud decoder. In various embodiments, the process (1500) can be executed by processing circuitry, such as the processing circuitry performing functions of the arithmetic decoding module (410) and the octree decoding module (430) at the decoder (400). In some embodiments, the process (1500) is implemented in software instructions, thus when the processing circuitry executes the software instructions, the processing circuitry performs the process (1500). The process starts at (S1501) and proceeds to (S1510).

At (S1510), a bitstream including a slice of a coded point cloud frame can be received. For example, the slice can include a series of syntax elements and bins representing a part of or entire coded point cloud frame.

At (S1520), an octree representing a geometry of points in a bounding box of the slice can be reconstructed. During the octree construction process, a current node of the octree can be partitioned with a quadtree (QT) partition, or a binary tree (BT) partition. For example, how to partition the current node of the octree using one of the QT partition, the BT partition or an octree (OT) partition can be determined based on predefined conditions. How to partition the current node of the octree using one of the QT partition, the BT partition or an OT partition can be determined also based on one or more parameters that each can be signaled in the bitstream, or use a locally preconfigured value.

During the construction of the octree, a value of a variable, denoted by partitionSkip, specifying a partition type and a partition direction of the current node of the octree can be determined. For example, the variable partitionSkip can be represented in binary form with three bits corresponding to x, y, and z directions, respectively, and each bit indicates whether a partition is performed along the respective x, y, or z direction. Based on the variable partitionSkip, a depth in an x, y, or z dimension for a child node of the current node of the octree can be updated.

During the construction of the octree, occupancy bits belonging to an 8-bins occupancy code of the current node of the octree can be received (or parsed) from the bitstream. Each occupancy bit corresponds to an occupied child node of the current node of the octree. 4 bins belonging to the 8-bins occupancy code are not signaled in the bit stream when the current node of the octree is partitioned with the QT partition, and 6 bins belonging to the 8-bins occupancy code are not signaled in the bitstream when the current node of the octree is partitioned with the BT partition.

Further, one or more syntax elements indicating three-dimension (3D) sizes of the bounding box of the slice of the coded point cloud frame can be received from the bitstream. For example, the bounding box of the slice can have a shape of a rectangular cuboid.

During the construction of the octree, after receiving a syntax element indicating the current node of the octree has a single occupied child node, 1 bin can be received if the variable partitionSkip indicates the BT partition, or 2 bins can be received if the variable partitionSkip indicates the QT partition. An occupancy map identifying occupied child nodes of the current node of the octree can be determined based on the received 1 or 2 bins.

During the construction of the octree, a parsing process can be performed over the bitstream to determine a syntax element of an occupancy map identifying occupied child nodes of the current node of the octree. During the parsing process, a bin of the syntax element of the occupancy map can be determined to be skipped based on the variable partitionSkip.

During the construction of the octree, for a child node of the current node of the octree coded in a direct mode, a log2 size for each of x, y, and z directions, denoted dx, dy, and dz, respectively, can be determined for the child node based on the variable partitionSkip. It can be determined positions of points in the child node is coded by fixed-length coding with (dx, dy, dz) bits, respectively. Accordingly, bins corresponding to co-ordinates of points in the child node can be received based on the known coding lengths.

In an example, a syntax element indicating one of the following parameters can be received in the bitstream for reconstructing the octree: a maximal number of implicit QT and BT partitions performed before OT partitions, a minimal size of implicit QT and BT partitions that prevents implicit QT and BT partitions of a node when all dimensions of the node are smaller than or equal to the minimal size, or a priority indicating which of implicit QT or BT partition is performed first when both QT and BT partitions are allowed.

In an example, during the construction of the octree, when an octree depth of the current node is smaller than a parameter K, or when a smallest log2 size among log2 sizes in x, y, and z directions of the current node is equal to a parameter M, a partition type and a partition direction for partitioning the current node can be determined according to conditions in the following table:

TABLE 39

| | Partition type and direction | | |
|---|---|---|---|
| | QT along x-y axes | QT along x-z axes | QT along y-z axes |
| Condition | $d_z < d_x = d_y$ | $d_y < d_x = d_z$ | $d_x < d_y = d_z$ |
| | Partition type and direction | | |
| | BT along x axis | BT along y axis | BT along z axis |
| Condition | $d_y < d_x$ and $d_z < d_x$ | $d_x < d_y$ and $d_z < d_y$ | $d_x < d_z$ and $d_y < d_z$ |

The parameter K can be an integer in a range of $0 \leq K \leq \max(d_x, d_y, d_z) - \min(d_x, d_y, d_z)$, and defines maximum times of implicit QT and BT partitions that are allowed before OT partitions. The parameter M can be an integer in a range of $0 \leq M \leq \min(d_x, d_y, d_z)$, and defines a minimal size of implicit QT and BT partitions that prevents implicit QT and BT partitions of a node when all dimensions of the node are smaller than or equal to M. The sizes dx, dy, and dz can be the log2 sizes of the current node in x, y, and z directions, respectively. In an example, the above partition type and partition direction for partitioning the current node can be represented by the variable partitionSkip.

In an example, the parameters K and M can each be signaled to the decoder, or take preconfigured value(s), and later updated, for example, based on 3D sizes of a root node of the slice, or whether a trisoup mode is enabled.

It is noted that the parameters K or M, or other parameters used for controlling or implementing implicit QT/BT partition are merely described as examples to illustrate some embodiments of the disclosure. There can be various forms of parameters signaled in a bitstream and used for conducting QT/BT partitions at a decoder. Those parameters may or may not be similar to K or M, but can be similarly used to control how QT/BT partitions are to be conducted such that a better point cloud compression performance can be achieved.

After (S1520), the process (1500) can terminate at (S1599).

VII. Computer System

The techniques described above, can be implemented as computer software using computer-readable instructions and physically stored in one or more computer-readable media. For example, FIG. 16 shows a computer system (1600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
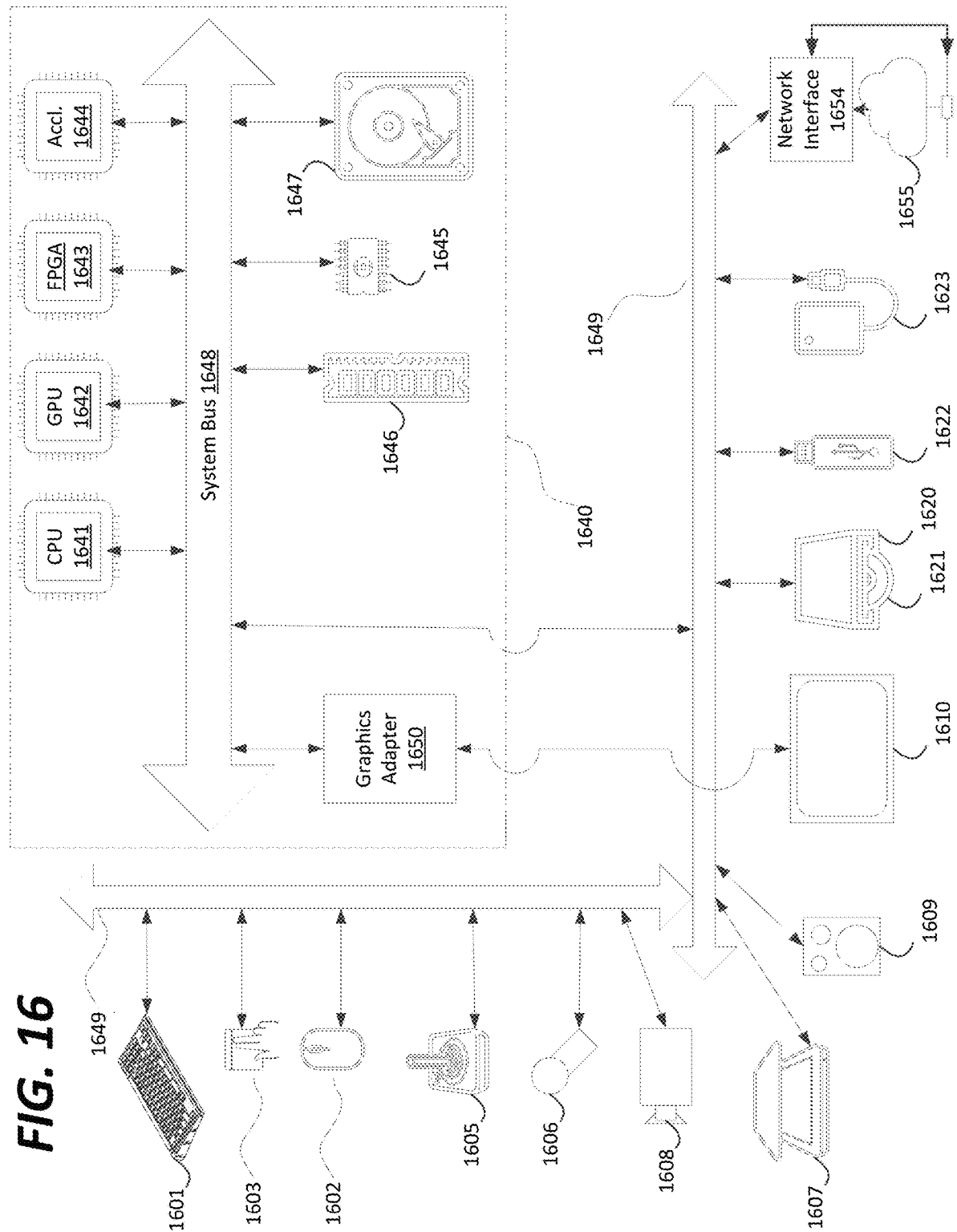
FIG. 16 shows a computer system for implementing geometry decoding techniques in various embodiments.

The components shown in FIG. 16 for computer system (1600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1600).

Computer system (1600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1601), mouse (1602), trackpad (1603), touch screen (1610), data-glove (not shown), joystick (1605), microphone (1606), scanner (1607), camera (1608).

Computer system (1600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1610), data-glove (not shown), or joystick (1605), but there can also be tactile feedback devices that do not serve as input devices), audio output devices (such as: speakers (1609), headphones (not depicted)), visual output devices (such as screens (1610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1600) can also include human accessible storage devices and their associated media such as optical media including CD/DVD ROM/RW (1620) with CD/DVD or the like media (1621), thumb-drive (1622), removable hard drive or solid state drive (1623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1600) can also include an interface (1654) to one or more communication networks (1655). Networks can for example be wireless, wireline, optical. Networks can further be local, wide-area, metropolitan, vehicular and industrial, real-time, delay-tolerant, and so on.

Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example USB ports of the computer system (1600)); others are commonly integrated into the core of the computer system (1600) by attachment to a system bus as described below (for example Ethernet interface into a PC computer system or cellular network interface into a smartphone computer system). Using any of these networks, computer system (1600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1640) of the computer system (1600).

The core (1640) can include one or more Central Processing Units (CPU) (1641), Graphics Processing Units (GPU) (1642), specialized programmable processing units in the form of Field Programmable Gate Areas (FPGA) (1643), hardware accelerators for certain tasks (1644), graphics adapters (1650), and so forth. These devices, along with Read-only memory (ROM) (1645), Random-access memory (1646), internal mass storage such as internal non-user accessible hard drives, SSDs, and the like (1647), may be connected through a system bus (1648). In some computer systems, the system bus (1648) can be accessible in the form of one or more physical plugs to enable extensions by additional CPUs, GPU, and the like. The peripheral devices can be attached either directly to the core's system bus (1648), or through a peripheral bus (1649). In an example, the scree (1610) can be connected to the graphics adapter (1650). Architectures for a peripheral bus include PCI, USB, and the like.

CPUs (1641), GPUs (1642), FPGAs (1643), and accelerators (1644) can execute certain instructions that, in combination, can make up the aforementioned computer code. That computer code can be stored in ROM (1645) or RAM (1646). Transitional data can be also be stored in RAM (1646), whereas permanent data can be stored for example, in the internal mass storage (1647). Fast storage and retrieve to any of the memory devices can be enabled through the use of cache memory, that can be closely associated with one or more CPU (1641), GPU (1642), mass storage (1647), ROM (1645), RAM (1646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1600), and specifically the core (1640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1640) that are of non-transitory nature, such as core-internal mass storage (1647) or ROM (1645). The software implementing various embodiments of the present disclosure can be stored in such devices and executed by core (1640). A computer-readable medium can include one or more memory devices or chips, according to particular needs. The software can cause the core (1640) and specifically the processors therein (including CPU, GPU, FPGA, and the like) to execute particular processes or particular parts of particular processes described herein, including defining data structures stored in RAM (1646) and modifying such data structures according to the processes defined by the software. In addition or as an alternative, the computer system can provide functionality as a result of logic hardwired or otherwise embodied in a circuit (for example: accelerator (1644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for point cloud decoding, comprising:
receiving a bitstream corresponding to a sequence of coded point cloud frames;
for at least one node in an octree representing a geometry of points in one of the coded point cloud frames, determining a partition type and direction corresponding to the at least one node based on a three-bit variable indicating whether partition is skipped in each of x, y, and z directions; and
reconstructing the octree based on the partition type and the direction for the at least one node.

2. The method of claim 1, wherein
the bitstream includes a first syntax element that indicates whether an implicit geometry partition is enabled for the sequence of coded point cloud frames, and
the method further includes determining whether the implicit geometry partition is enabled for the sequence of coded point cloud frames based on the first syntax element.

3. The method of claim 1, wherein, when implicit geometry partition is enabled for the sequence of coded point cloud frames, the bitstream includes:
a first parameter that indicates a maximum number of quadtree (QT) and binary tree (BT) partitions performed before octree (OT) partitions, and
a second parameter indicating a minimum size of implicit QT and BT partitions.

4. The method of claim 1, wherein, when implicit geometry partition is enabled for the sequence of coded point cloud frames, the bitstream includes size information of a bounding box that indicates a respective size for each dimension of the bounding box.

5. The method of claim 1, wherein, when implicit geometry partition is disabled for the sequence of coded point cloud frames, the bitstream includes size information of a bounding box that indicates a same size for each dimension of the bounding box.

6. The method of claim 1, wherein a planar mode is disabled when implicit geometry partition is enabled for the sequence of coded point cloud frames.

7. The method of claim 1, wherein the bitstream includes a second syntax element that indicates whether a planar mode is enabled when implicit geometry partition is disabled for the sequence of coded point cloud frames.

8. An apparatus for point cloud encoding, comprising:
   processing circuitry configured to:
      for at least one node in an octree representing a geometry of points in one of a sequence of coded point cloud frames, determine a partition type and direction corresponding to the at least one node based on a three-bit variable indicating whether partition is skipped in each of x, y, and z directions; and
      generate a bitstream corresponding to the sequence of coded point cloud frames by encoding the octree based on the partition type and the direction for the at least one node.

9. The apparatus of claim 8, wherein
   the bitstream includes a first syntax element that indicates whether an implicit geometry partition is enabled for the sequence of coded point cloud frames, and
   the processing circuitry is configured to determine whether the implicit geometry partition is enabled for the sequence of coded point cloud frames based on the first syntax element.

10. The apparatus of claim 8, wherein, when implicit geometry partition is enabled for the sequence of coded point cloud frames, the bitstream includes:
   a first parameter that indicates a maximum number of quadtree (QT) and binary tree (BT) partitions performed before octree (OT) partitions, and
   a second parameter indicating a minimum size of implicit QT and BT partitions.

11. The apparatus of claim 8, wherein, when implicit geometry partition is enabled for the sequence of coded point cloud frames, the bitstream includes size information of a bounding box that indicates a respective size for each dimension of the bounding box.

12. The apparatus of claim 8, wherein, when implicit geometry partition is disabled for the sequence of coded point cloud frames, the bitstream includes size information of a bounding box that indicates a same size for each dimension of the bounding box.

13. The apparatus of claim 8, wherein a planar mode is disabled when implicit geometry partition is enabled for the sequence of coded point cloud frames.

14. The apparatus of claim 8, wherein the bitstream includes a second syntax element that indicates whether planar mode is enabled when implicit geometry partition is disabled for the sequence of coded point cloud frames.

15. A method of processing visual media data, the method comprising:
   processing a bitstream that includes a bitstream of the visual media data according to a format rule, wherein
      the bitstream includes coding information of a sequence of coded point cloud frames,
      the format rule specifies that, for at least one node in an octree representing a geometry of points in one of the coded point cloud frames, a partition type and the direction corresponding to the at least one node is determined based on a three-bit variable indicating whether partition is skipped in each of x, y, and z directions; and
      the format rule specifies that the octree is reconstructed from the bitstream based on the partition type and direction for the at least one node.

16. The method of claim 15, wherein, when implicit geometry partition is enabled for the sequence of coded point cloud frames, the bitstream includes:
   a first parameter that indicates a maximum number of quadtree (QT) and binary tree (BT) partitions performed before octree (OT) partitions, and
   a second parameter indicating a minimum size of implicit QT and BT partitions.

17. The method of claim 15, wherein, when implicit geometry partition is enabled for the sequence of coded point cloud frames, the bitstream includes size information of a bounding box that indicates a respective size for each dimension of the bounding box.

18. The method of claim 15, wherein, when implicit geometry partition is disabled for the sequence of coded point cloud frames, the bitstream includes size information of a bounding box that indicates a same size for each dimension of the bounding box.

19. The method of claim 15, wherein a planar mode is disabled when implicit geometry partition is enabled for the sequence of coded point cloud frames.

20. The method of claim 15, wherein
   the bitstream includes a first syntax element that indicates whether implicit geometry partition is enabled for the sequence of coded point cloud frames, and
   the method further includes determining whether the implicit geometry partition is enabled for the sequence of coded point cloud frames based on the first syntax element.

* * * * *